(12) United States Patent
Butler et al.

(10) Patent No.: US 12,454,155 B2
(45) Date of Patent: Oct. 28, 2025

(54) TORSION TUBE MOUNTED AERODYNAMIC SYSTEM

(71) Applicant: FLOWBELOW AERO, INC., Round Rock, TX (US)

(72) Inventors: Joshua Butler, Austin, TX (US); Kyle Walker, Austin, TX (US); Redza Shah, Austin, TX (US); Zane McCarthy, Jollyville, TX (US); Michael O'Connell, Round Rock, TX (US); Aaron McGraw, Austin, TX (US)

(73) Assignee: FLOWBELOW AERO, INC., Round Rock, TX (US)

( * ) Notice: Subject to any disclaimer, the term of this patent is extended or adjusted under 35 U.S.C. 154(b) by 0 days.

(21) Appl. No.: 18/395,338

(22) Filed: Dec. 22, 2023

(65) Prior Publication Data
US 2024/0123774 A1    Apr. 18, 2024

Related U.S. Application Data

(63) Continuation of application No. 16/466,268, filed as application No. PCT/US2017/060242 on Nov. 6, 2017, now Pat. No. 11,932,060.

(60) Provisional application No. 62/417,387, filed on Nov. 4, 2016.

(51) Int. Cl.
*B60C 23/00* (2006.01)

(52) U.S. Cl.
CPC .. *B60C 23/00305* (2020.05); *B60C 23/00318* (2020.05); *B60C 23/00354* (2020.05); *B60C 23/007* (2013.01)

(58) Field of Classification Search
CPC ........ B60C 23/00305; B60C 23/00354; B60C 23/00318; B60C 23/00327; B60C 23/007; B60G 21/045; B60G 21/026
See application file for complete search history.

(56) References Cited

U.S. PATENT DOCUMENTS

| | | | |
|---|---|---|---|
| 4,981,162 A * | 1/1991 | Grenie | B60C 23/10 |
| | | | 152/417 |
| 5,100,206 A | 3/1992 | Feng | |
| 5,922,152 A | 7/1999 | Patti | |
| 6,011,463 A | 1/2000 | Cormier | |
| 7,218,210 B2 | 5/2007 | Schoenberger | |
| 9,365,074 B2 | 6/2016 | Polka | |
| 11,951,771 B2 | 4/2024 | Butler | |

(Continued)

FOREIGN PATENT DOCUMENTS

DE    202008003758 U1 *  9/2009  ........... B60G 11/225

OTHER PUBLICATIONS

Machine Translation of DE 202008003758 U1, 15 pages (Year: 2009).*

(Continued)

*Primary Examiner* — S. Joseph Morano
*Assistant Examiner* — Emily G. Castonguay
(74) *Attorney, Agent, or Firm* — Sprinkle IP Law Group

(57) ABSTRACT

An aerodynamic system comprising a torsion tube, a first rotatory coupling coupled to the torsion tube and adapted to mount to a first wheel hub, a second rotary coupling coupled to the torsion tube distal from the first rotary coupling and adapted to mount to a second wheel hub, and a non-rotating fairing panel mounted to the torsion tube.

20 Claims, 27 Drawing Sheets

(56) References Cited

U.S. PATENT DOCUMENTS

| | | |
|---|---|---|
| 12,252,185 B2 | 3/2025 | Butler |
| 2003/0051545 A1 | 3/2003 | Wallach |
| 2006/0175892 A1* | 8/2006 | Korpi ..................... B60B 7/20 |
| | | 301/37.25 |
| 2012/0056444 A1* | 3/2012 | Stimel ................. B62D 35/001 |
| | | 296/180.2 |
| 2013/0015698 A1* | 1/2013 | Butler .................... B60B 7/066 |
| | | 301/37.29 |
| 2014/0117712 A1* | 5/2014 | Butler ................... B62D 27/02 |
| | | 296/180.2 |
| 2015/0059946 A1* | 3/2015 | Keeney ............ B60C 23/00305 |
| | | 152/416 |
| 2015/0174972 A1* | 6/2015 | Zhou ................ B60C 23/00345 |
| | | 340/447 |
| 2016/0250901 A1* | 9/2016 | Hennig ............ B60C 23/00363 |
| | | 152/417 |
| 2024/0253392 A1 | 8/2024 | Butler |
| 2025/0249968 A1 | 8/2025 | Butler |

OTHER PUBLICATIONS

Office Action for Canadian Patent Application No. 3,046,189, issued Apr. 5, 2024, 5 pgs.
Office Action for European Patent Application No. 21171821.8, issued May 16, 2024, 4 pgs.
Examination Report issued in Canadian Patent Application No. 3,046,189, by the Canadian Intellectual Property Office on Mar. 6, 2025, 4 pgs.

* cited by examiner

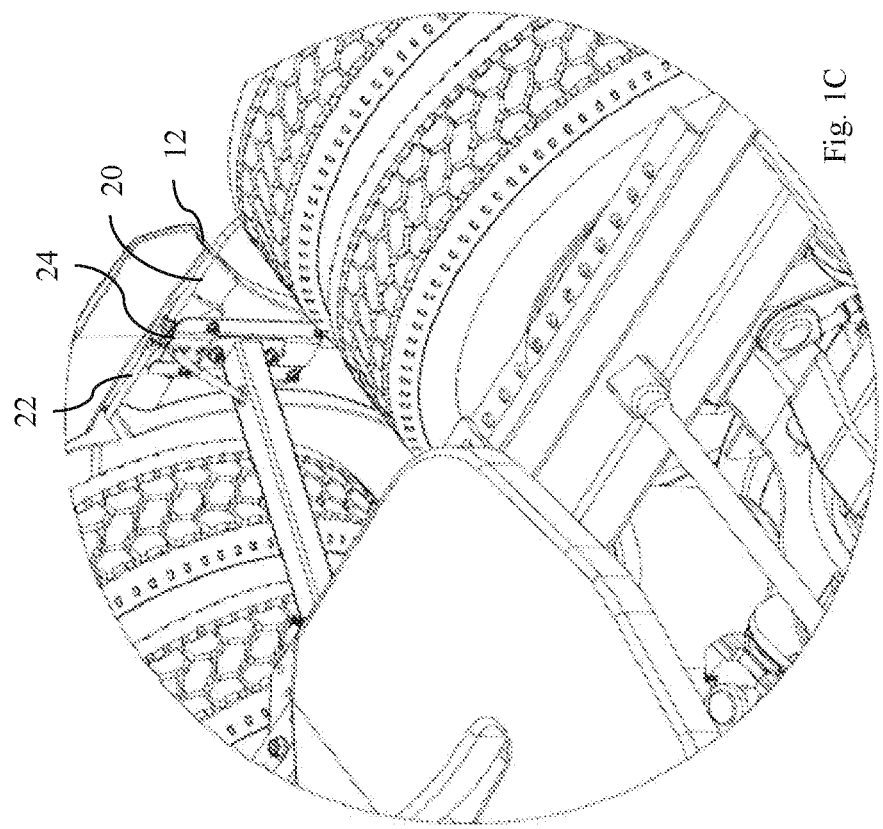
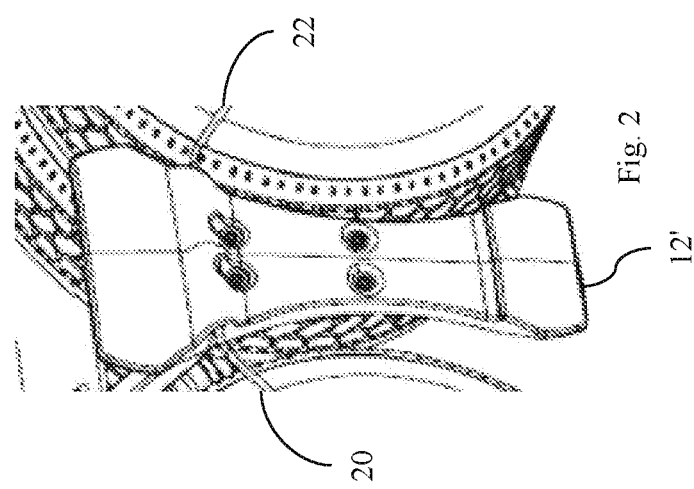

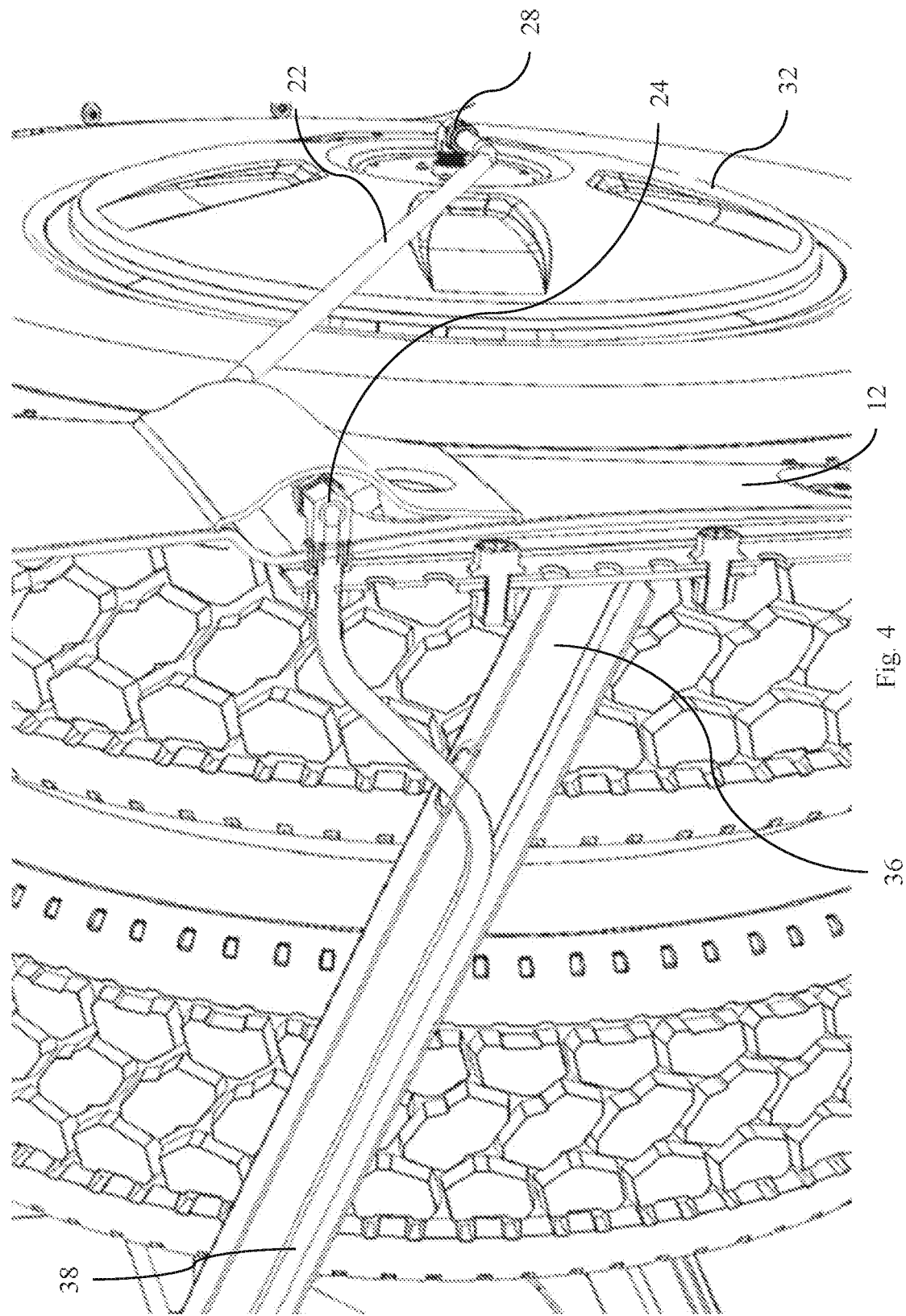

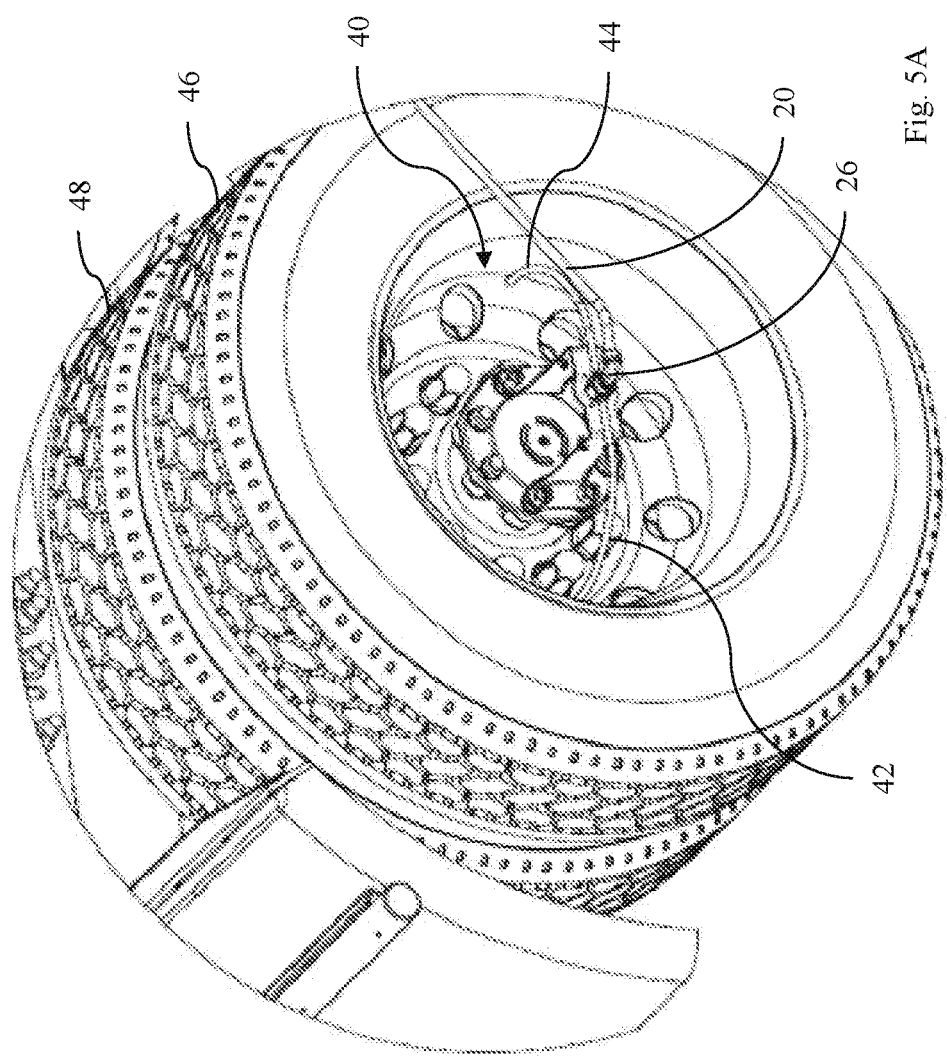

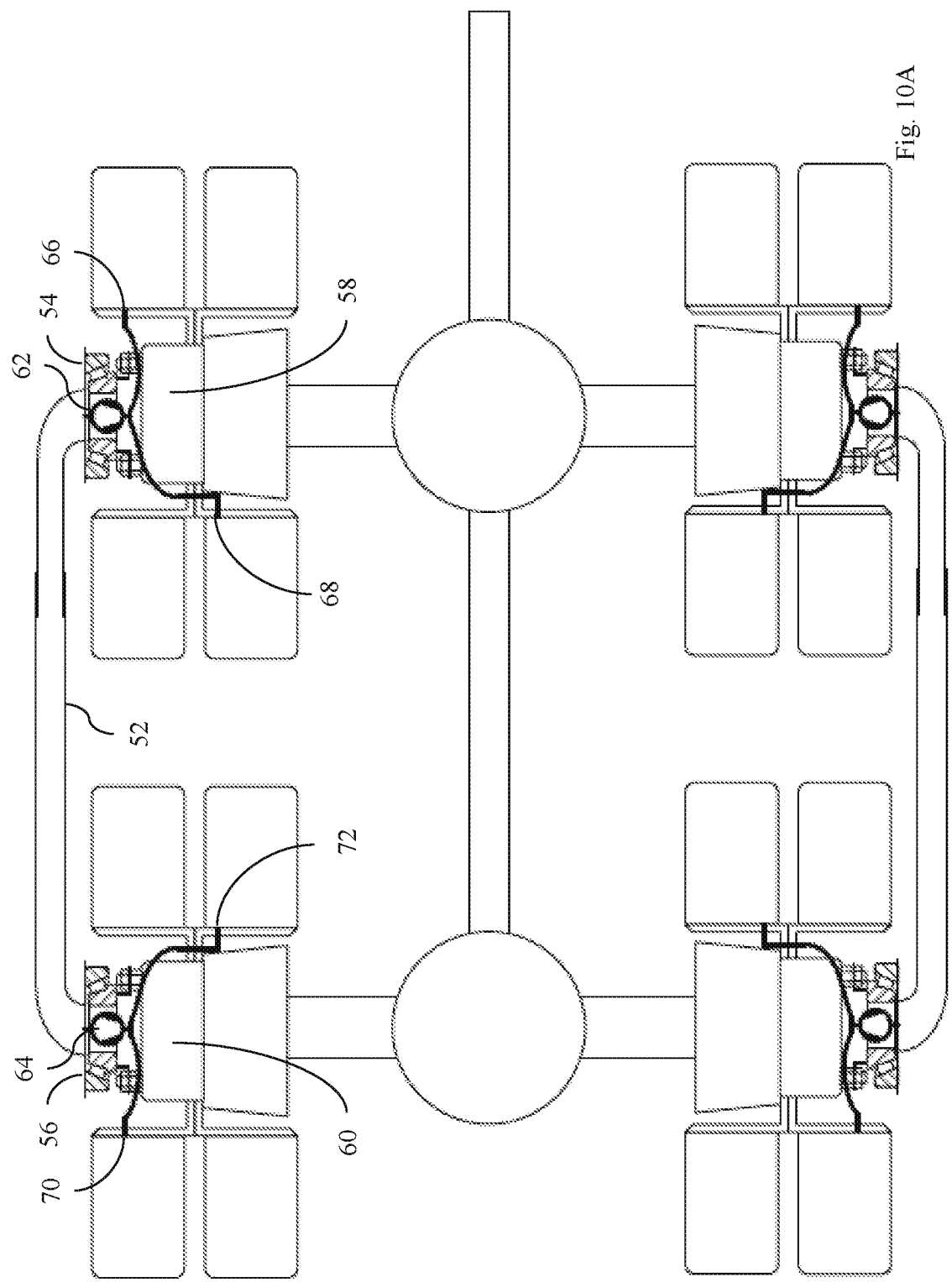

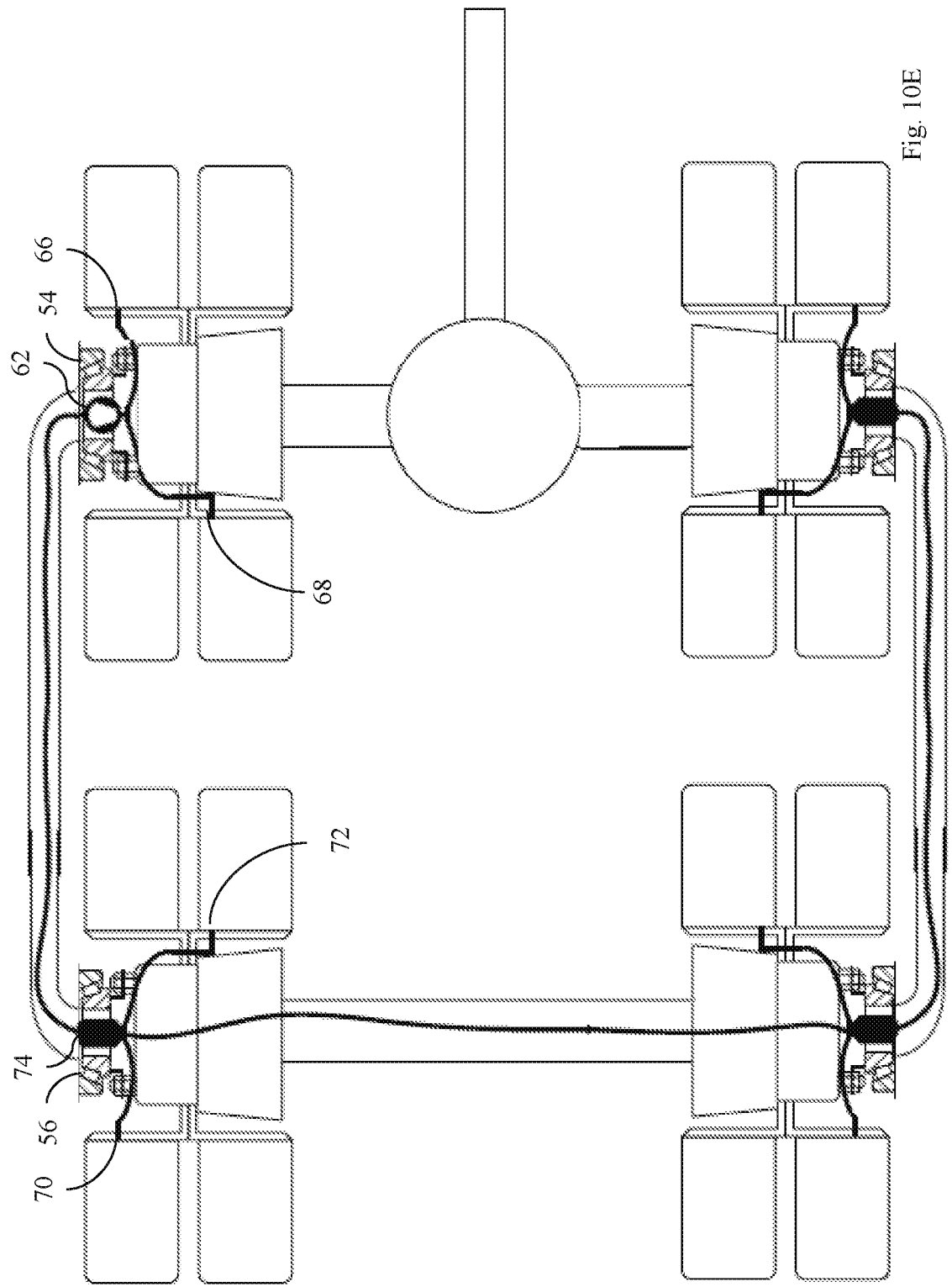

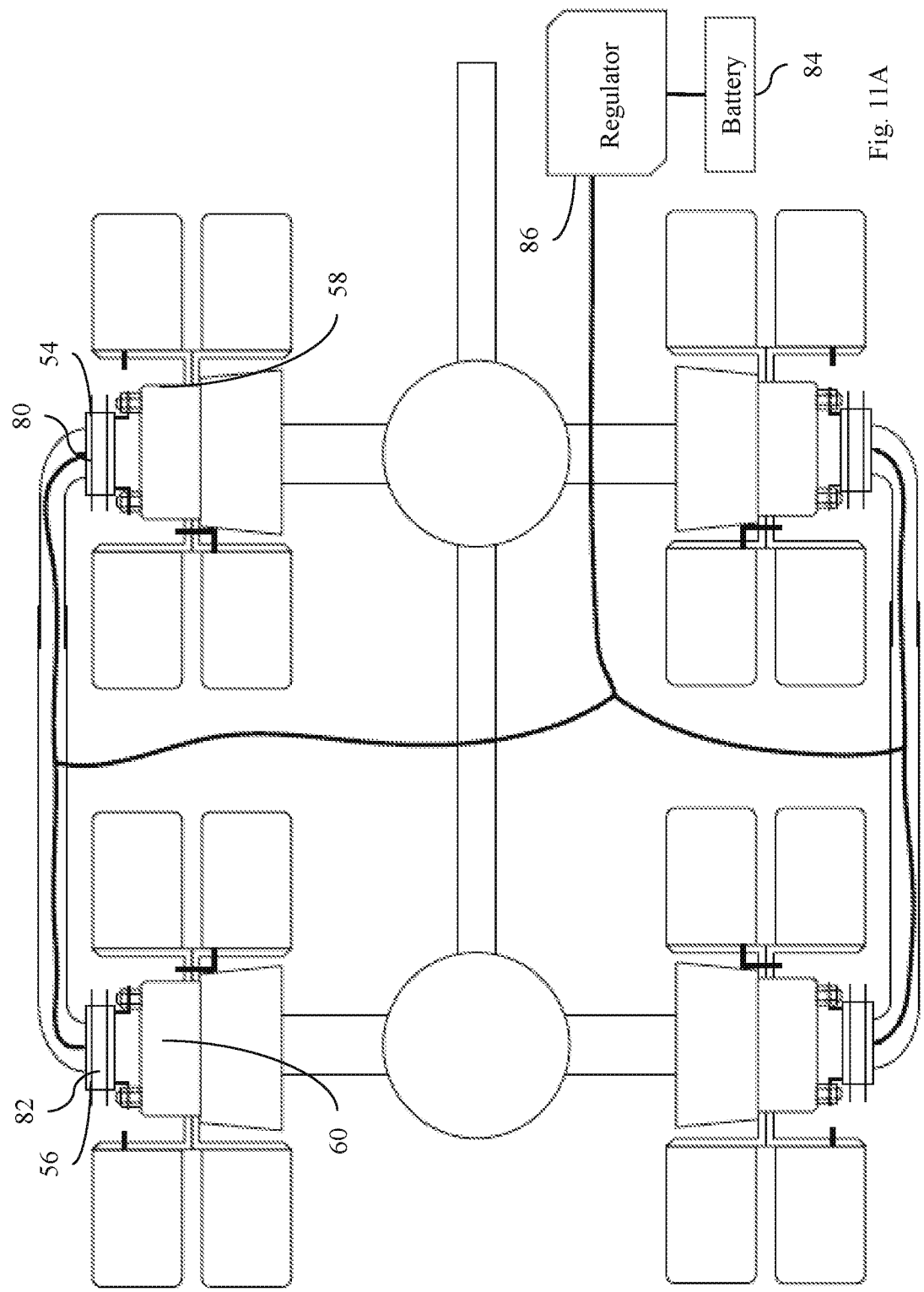

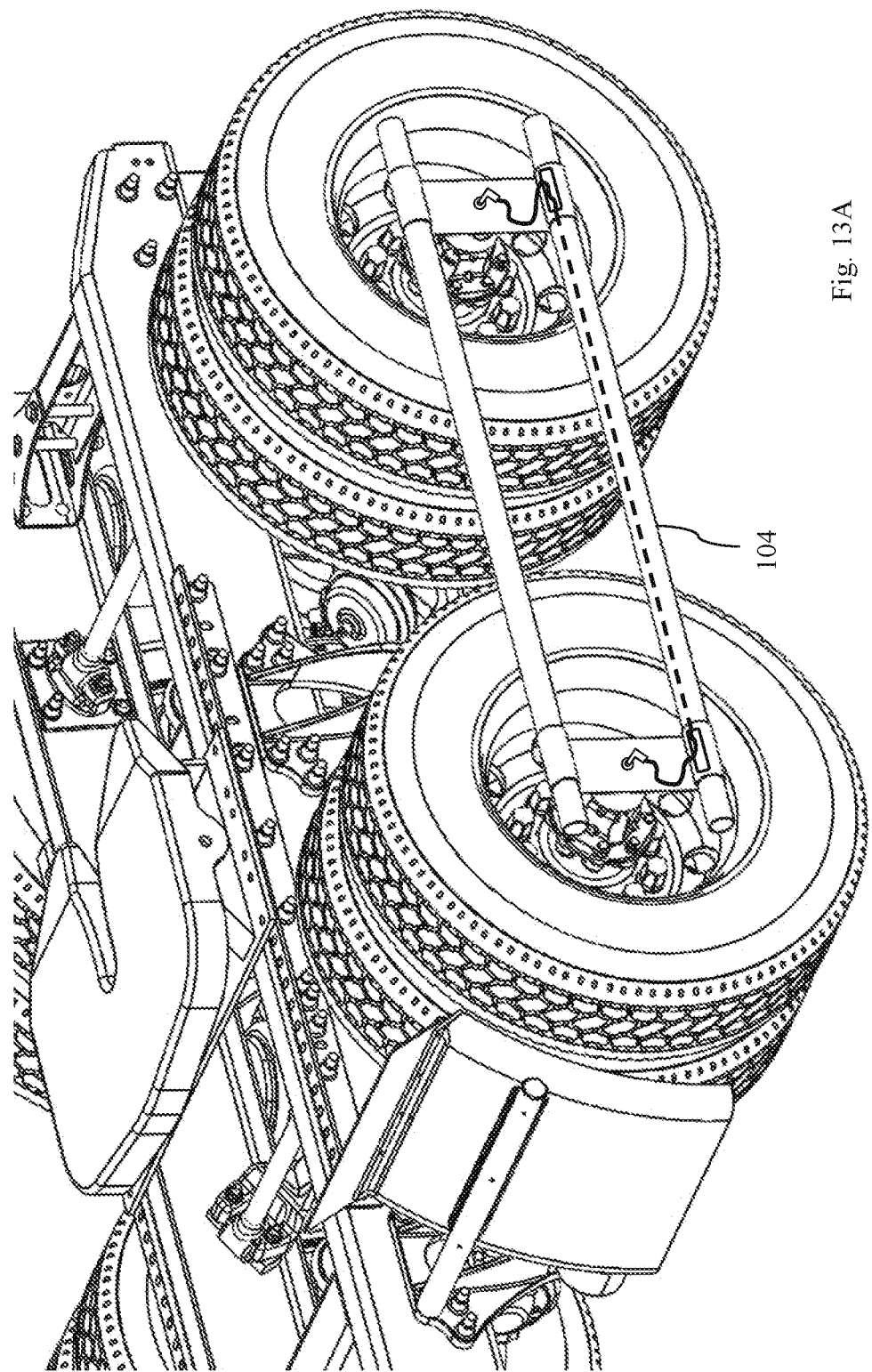

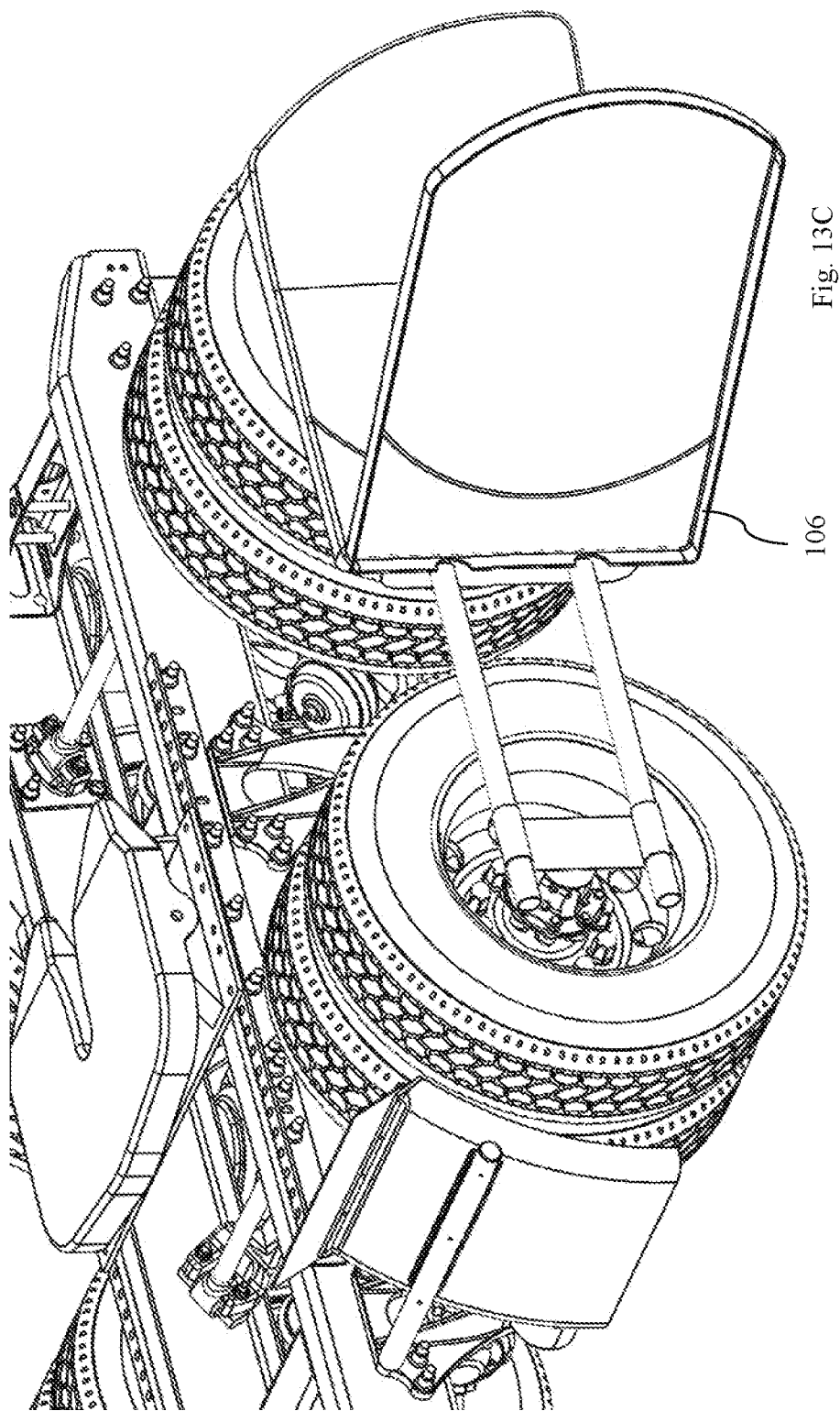

TORSION TUBE MOUNTED AERODYNAMIC SYSTEM

CROSS-REFERENCE TO RELATED APPLICATIONS

This application is a continuation of, and claims a benefit of priority under 35 U.S.C. 120 of, U.S. patent application Ser. No. 16/466,268 filed Jun. 3, 2019, issued as U.S. Pat. No. 11,932,060, entitled "Chassis Mounted Energy Extraction and Delivery System," which is a 35 U.S.C. 371 national stage entry of and claims priority to International Application No. PCT/US2017/060242 filed Nov. 6, 2017, entitled "Chassis Mounted Energy Extraction and Delivery System," which claims a benefit of priority to U.S. Provisional Application No. 62/417,387 filed Nov. 4, 2016, entitled "Chassis Mounted Energy Extraction and Delivery System," which are hereby incorporated herein for all purposes.

BACKGROUND OF THE INVENTION

1. Field of the Invention

Aspects of the present disclosure are generally related to energy extraction and delivery systems which are at least partially integrated with the chassis of a vehicle. Aspects of the present disclosure are also related to torsion tube mounted aerodynamic systems.

2. Description of the Related Art

In general, in the descriptions that follow, we will italicize the first occurrence of each special term of art that should be familiar to those skilled in the art of vehicular fairing systems, tire inflation systems, or any of the prior art energy extraction and delivery systems. In addition, when we first introduce a term that we believe to be new or that we will use in a context that we believe to be new, we will bold the term and provide the definition that we intend to apply to that term.

Hereinafter, when we refer to a facility, we mean a mechanical, hydraulic, electrical or electronic device or an associated set of such devices adapted to perform a particular function regardless of the physical or circuit layout of an embodiment thereof. However, unless we expressly state to the contrary, we consider the form of instantiation of any facility that practices our invention as being purely a matter of design choice.

Maintaining proper tire inflation in terrestrial vehicles, and, in particular, tractors and trailers designed to haul freight is critical to tire life, fuel economy, and safety. Of similar importance to fuel economy and relating to its improvement is the aerodynamic shape of the vehicle. By designing a system that addresses both needs, optimal fuel economy can be achieved while also protecting the tire inflation system itself.

In North America, several automatic tire inflation systems exist for trailers and are produced by companies such as Pressure Systems International, Stemco, and Hendrickson. Most of these systems utilize an air line that traverses through the axles of the trailers. However, these products are only commercially available for un-powered axles. To date, there have been few commercially successful automatic tire inflation systems for the tractor's drive wheels. Many companies are looking into how to use an air line through the axle of a powered axle, but this poses many technical challenges. One company, Aperia Technologies, has produced and sold a system called the Halo which is external to, but mounts directly to the hub. In the Halo system, a gravity-referenced, rotary air pump (see, e.g., the peristaltic pump disclosed in U.S. Pat. No. 8,747,084) develops and delivers pressurized air to an adjacent wheel using energy derived from the rotation of that wheel (see, e.g., U.S. Pat. No. 9,039,392). Another type of external tire inflation system that is currently commercially available from RCR Systems Limited (Canada), D/B/A Vigia ("Vigia"), can be seen at: www.vigia.ca/images/Pdf/Vigia_external_brochure.pdf, a downloaded copy of which is submitted herewith and expressly incorporated herein by reference. This type of system has an air line that extends from the chassis of the vehicle to a location in front of, between, or behind, one or more axles of the vehicle. One or more air lines extend from this point to a rotary union attached to the hub of one or more wheels. Air is delivered through the union, and hoses which rotate with the wheel then deliver pressurized air to one or more tires.

In addition to tire inflation systems, other chassis-mounted energy extraction and delivery systems have been proposed. Examples of such systems can be seen in U.S. Pat. Nos. 9,074,595, 9,080,565 and 9,145,887.

There are significant problems with these types of energy extraction and delivery systems, which explains why they are not widely adopted. First, the systems are costly. Second, one or more of the component elements may be prone to damage given that some or all of those components extend outboard of the tires. In particular, their location makes them prone to damage from curbing or scraping, tire blow-outs, road debris, and extreme weather. Third, the external tire systems are not aesthetically pleasing. Fourth, the external tire systems have blunt surfaces which may create aerodynamic drag.

BRIEF SUMMARY OF THE INVENTION

One embodiment provides an external tire inflation facility adapted for use with a vehicle comprising: a chassis; a first axle coupled to the chassis and having a first hub; a first wheel mounted on the first hub and having a first valve stem; a source of compressed air; a fairing panel configured to reduce the aerodynamic drag of the vehicle when the vehicle is in motion; and a bracket coupled to the chassis and to the panel. In one embodiment, the tire inflation facility comprises: a first compressed air coupler adapted to be coupled to the compressed air source; a first rotary union coupled to the first hub; and a compressed air distribution facility comprising: a first pressure hose coupled between the first rotary union and the first valve stem; and a second pressure hose coupled between the first compressed air coupler and the first rotary union, at least a portion of the second pressure hose being supported by the bracket.

Another embodiment provides a torsion bar facility adapted for use with a vehicle comprising: a chassis; and a first axle coupled to the chassis and having a first hub. In this embodiment, the torsion bar facility comprises: a torsion bar having first and second ends; a first rotary coupling adapted to couple the first end of the torsion bar to the hub; and a second coupling adapted to couple the second end of the torsion bar to the chassis. In one embodiment, a fairing is mounted to the torsion bar.

BRIEF DESCRIPTION OF THE SEVERAL VIEWS OF THE DRAWINGS

Our invention may be more fully understood by a description of certain preferred embodiments in conjunction with the attached drawings in which:

FIG. 1, comprising FIG. 1A, FIG. 1B, and FIG. 1C, is a perspective view of a first embodiment of our energy extraction and delivery facility in accordance with our invention;

FIG. 2 illustrates one alternate embodiment of the fairing panel illustrated in FIG. 1;

FIG. 4 is a close-up view of the outer portion of FIG. 3;

FIG. 5, comprising FIG. 5A, FIG. 5B and FIG. 5C, illustrates other possible embodiments of our energy extraction and delivery facility;

FIG. 8, comprising

FIG. 10, comprising FIG. 10A, FIG. 10B, FIG. 10C, FIG. 10D, and FIG. 10E, illustrates, in schematic form, several possible embodiments of the energy extraction and delivery facility illustrated in FIG. 9;

FIG. 11, comprising FIG. 11A, and FIG. 11B, illustrates, in schematic form, several possible embodiments of an energy extraction and delivery facility in accordance with another embodiment of our invention:

FIG. 12, comprising

FIG. 13, comprising FIG. 13A, FIG. 13B and FIG. 13C, is a perspective view of yet another embodiment of our energy extraction and delivery facility;

Figure 1A:
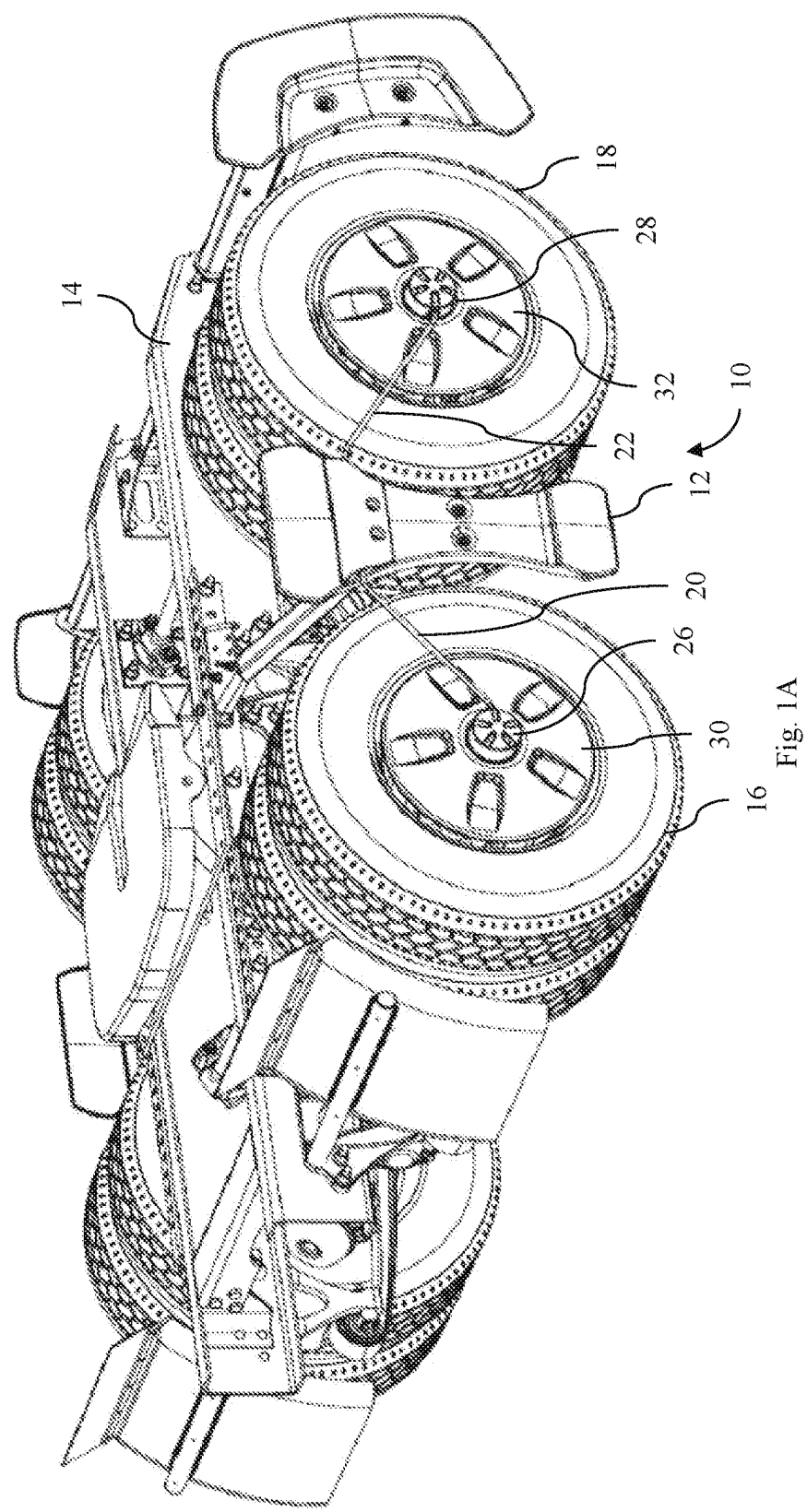

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 1B:
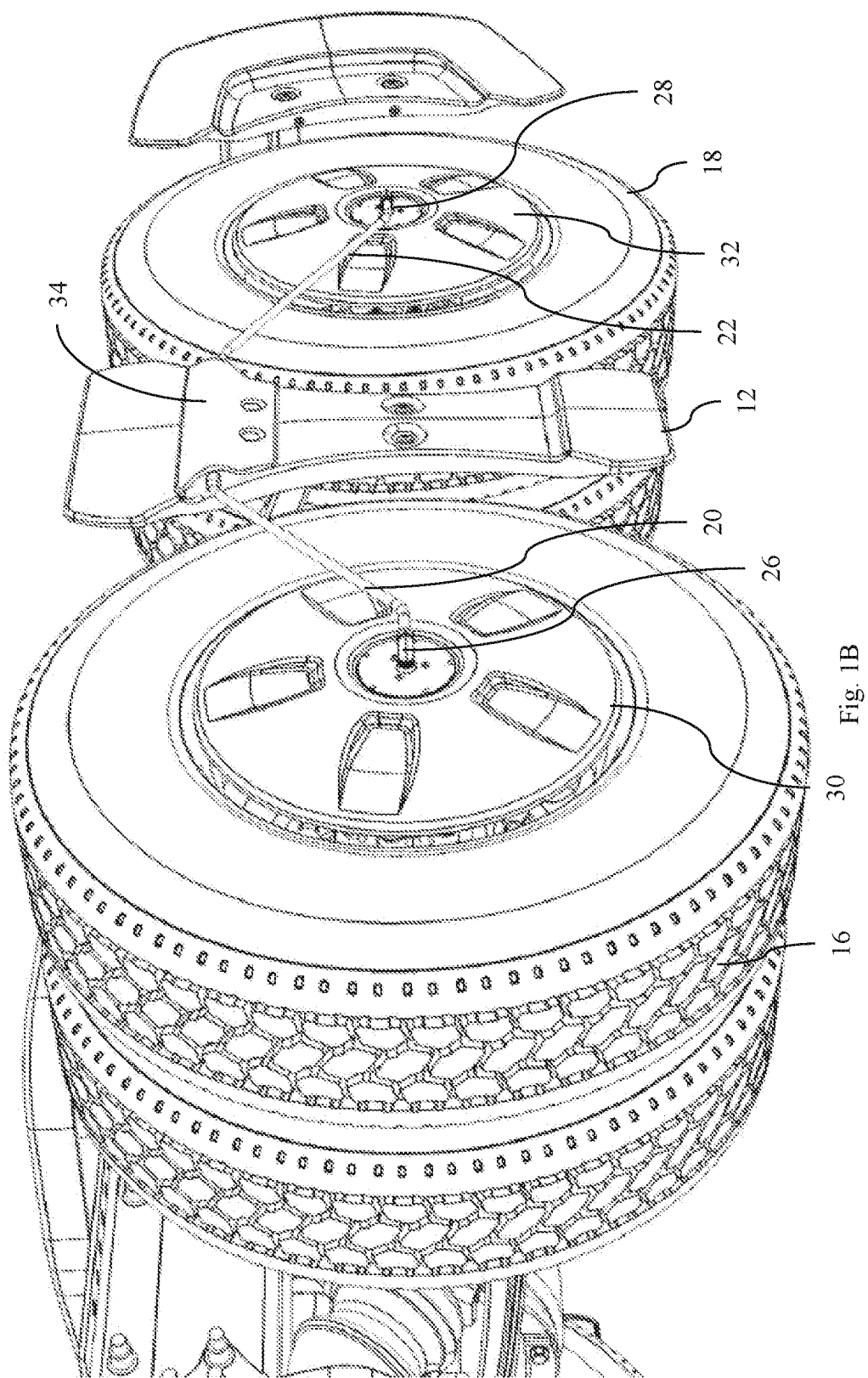
Figure 5B:
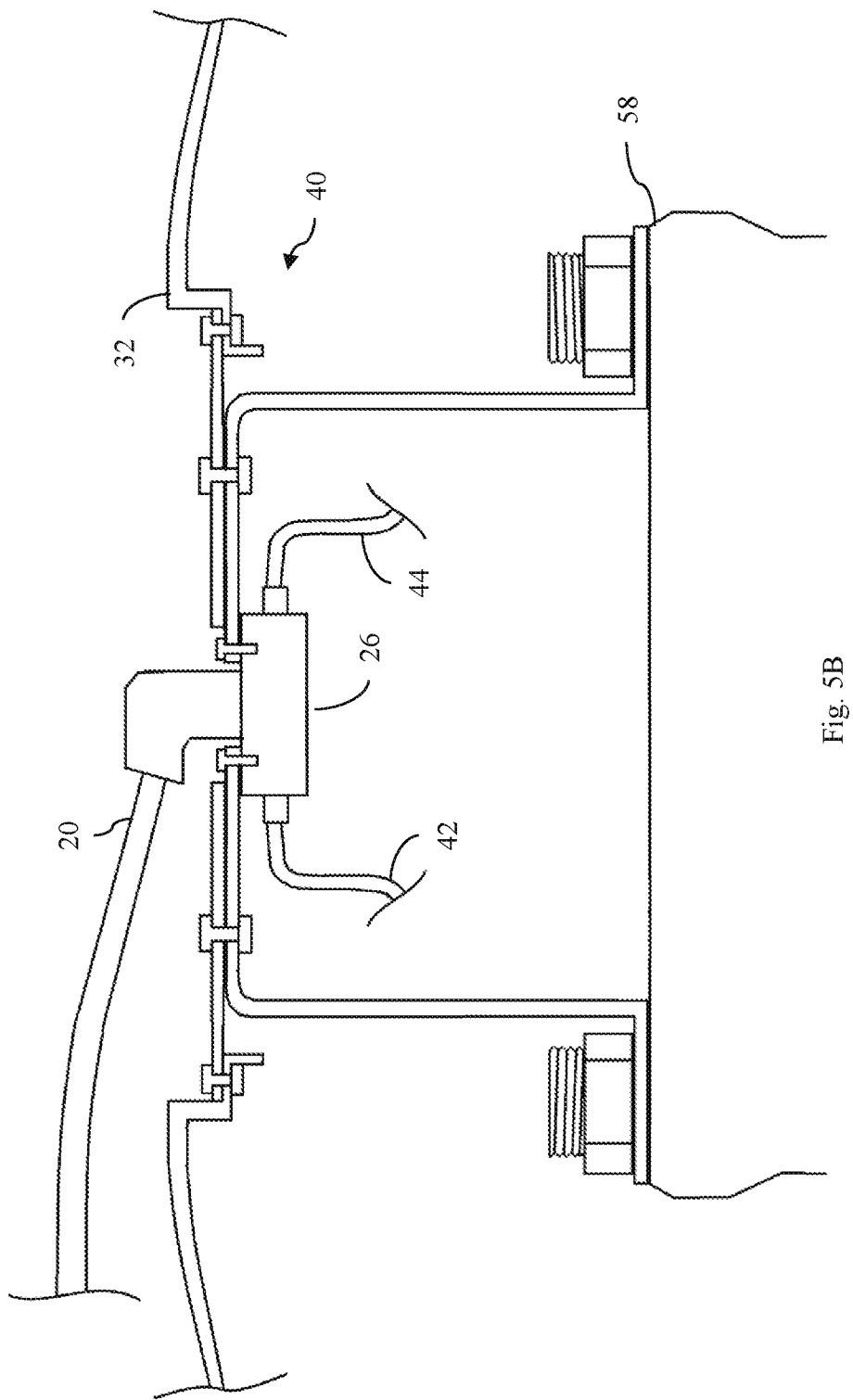

Shown in FIG. 1 is an external energy extraction and delivery system 10 adapted to be integrated into an existing aerodynamic fairing 12 mounted on the chassis 14 of a vehicle, e.g., a tractor (a trailer, a truck, etc.) such that at least a portion of the fairing 12 projects outboard of the tires 16-18 thereby tending to enhance the aerodynamic flow of air past the tires 16-18. As illustrated in FIG. 1A and FIG. 1B, the central portion of the aerodynamic fairing 12, located generally between the tires 16-18 being pressurized, is retrofitted with pressurized hoses 20-22, each attached at one end to a T junction 24 (see, FIG. 1C) and at the other end to a respective rotary union 26-28 mounted in the center of a respective aerodynamic wheel cover 30-32 attached to a respective one of the axles (see, e.g., FIG. 10). The retrofit to an existing aerodynamic fairing panel 12 may consist of direct modifications to the panel 12 such as cutouts or additional components attached to the panel 12 such as a protective cover 34 to protect the T junction 24. The cover 34 may be mounted to the existing aerodynamic fairing panel 12 with existing fasteners as shown, or other common attachment methods. The cover 34 may be aesthetically designed and configured to provide a suitable location for branding. The cover 34 may be removable for maintenance and inspection of the T junction 24 and pressurized lines 20-22. In general, the fairing panel 12 is shaped and positioned so as to create a low drag area between the tires 16-18. The pressurized lines 20-22 are adapted to maintain proper pressure in the tires 16-18 for both fuel savings and safety concerns. The pressurized air lines 20-22 may consist of flexible hosing as well as rigid hosing. Each pressurized line 20-22 from the T junction 24 passes through an orifice (see, e.g., FIG. 5B) in a modified wheel cover 30-32, such as one derived from U.S. Pat. No. 9,327,550, and connects to a center-mounted rotary union 26-28 such as one derived from U.S. Pat. No. 10,562,356, or to a rotary union 26-28 like one used in the Vigia system, cited above. As illustrated in FIG. 5B, this modification can be accomplished by including a suitable hole in the center of the wheel cover 30-32, and, if necessary, the wheel cover bracket. Of course, the hole should be large enough to allow at least a portion of the rotary union 26-28 to pass therethrough. In general, the covers 30-32 should rotate freely without interfering with the air hoses 20-22. Alternatively, the wheel cover 30-32 may be attached to the hoses or to the non-rotating portion of the rotary union 26-28, which may be preferable if it is not desirable for the wheel cover 30-32 to rotate with the tires 16-18.

In the embodiment illustrated in FIG. 2, the aerodynamic fairing 12' is modified such that the protective cover and center aerodynamic fairing are integral. This configuration has fewer parts and may be more cost effective than the retro-fittable configuration as illustrated in FIG. 1A and FIG. 1B.

Figure 3:
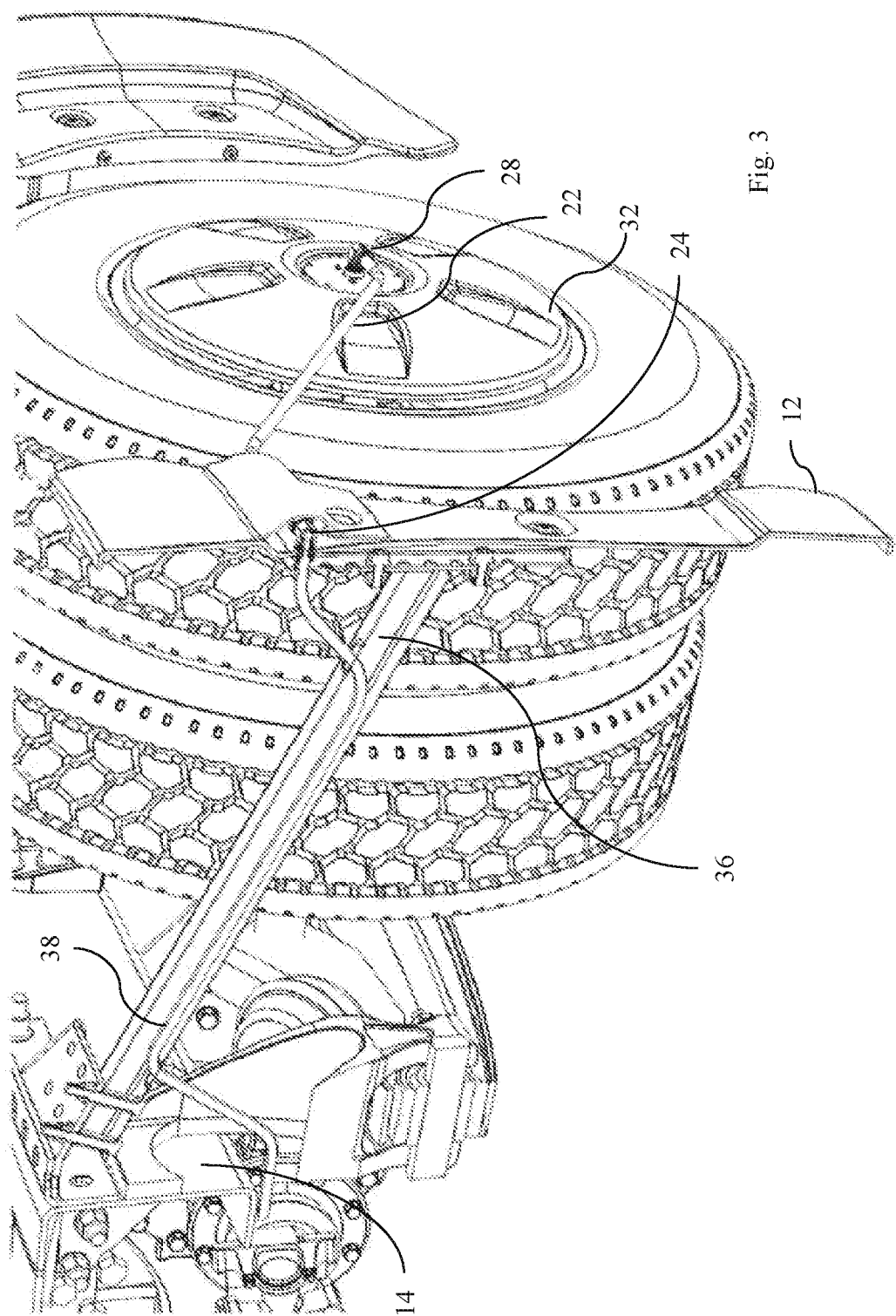
FIG. 3 is a cross-sectional view of the fairing panel illustrated in FIG. 1.

As illustrated in FIG. 3, the fairing panel 10 is attached to the frame 14 via a hollow, square-tube mounting bracket 36 (shown in cross-section) and its attendant mounting hardware. As can best be seen in FIG. 4, a supply line 38, routed through the inside of the mounting bracket 36, is coupled to the T junction 24, which is connected via hose 22 to the rotary union 28 in the center of the wheel cover 32. The supply line 38 runs from the bracket to the frame 14 of the vehicle where it may connect with the lines run to the other wheels or the conventional vehicle-mounted compressed air source (see, e.g., FIG. 10C). The system may employ any number of one-way valves, air pressure regulators, air pressure sensors, temperature sensors, or other technologies frequently used in combination with other internal and external tire inflation systems known in the art. Although not shown, it may also be desirable to employ the use of quick-disconnect fittings to simplify the removal of the system when changing a tire, for example. It may also be desirable, for example, to employ the use of break-away couplings (see, e.g., www.manntek.se/products/safety-break-away-couplings) to improve the safety of the system. In particular, tire blow outs, for example, could cause damage to the system and the use of break-away couplings could limit the damage to the system, e.g., to a specific section of hosing.

Figure 5C:
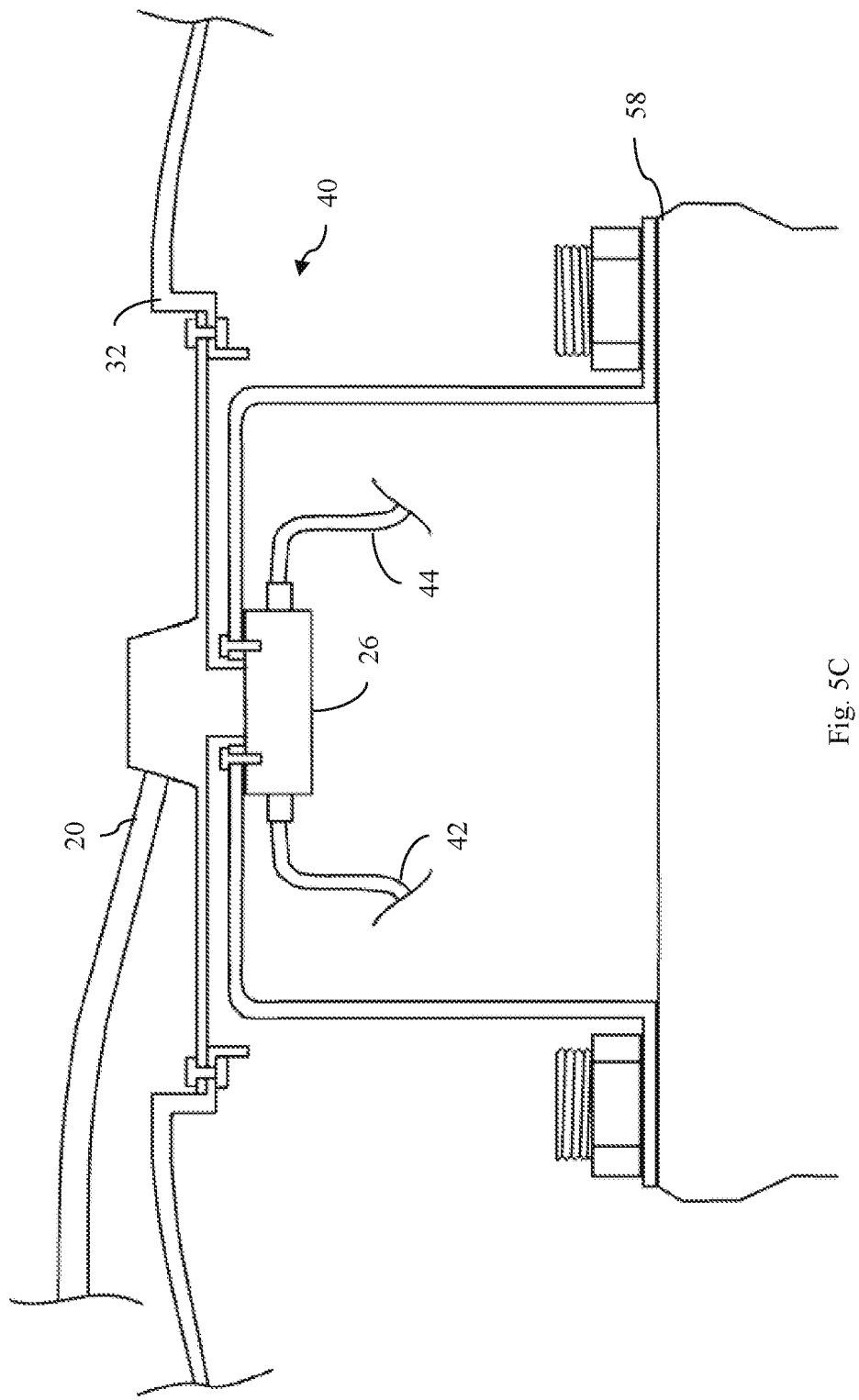
Figure 6:
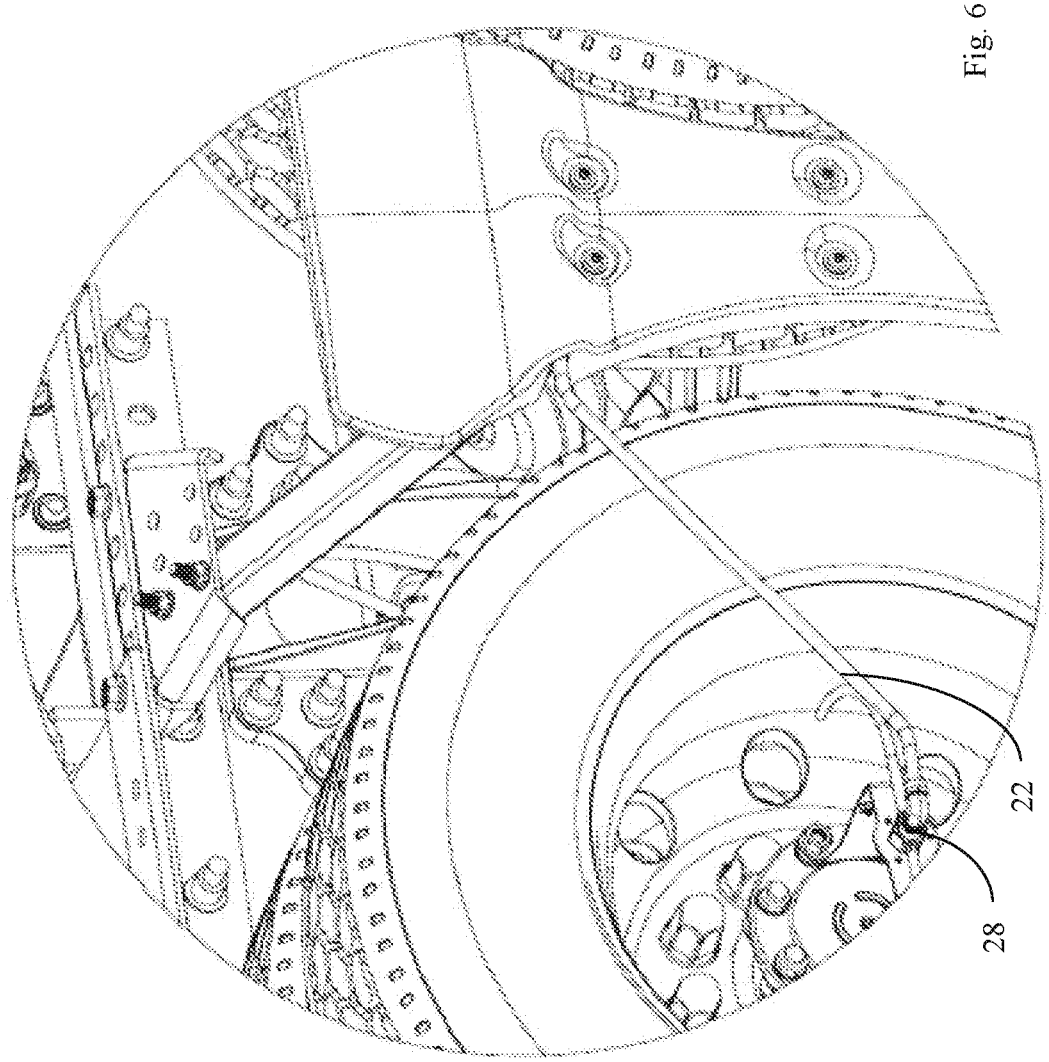
FIG. 6 illustrates the connection of the energy extraction and delivery of FIG. 5A to the fairing panel of FIG. 1.

By way of example, FIG. 5A depicts the wheel inflation facility 40 with the wheel cover 30 removed. In this embodiment, the rotary union 26 is coupled via a hose 42 to the valve stem (not shown) of the outer wheel 46 of the front tandem pair, and via a hose 44 to the valve stem (again, not shown) of the inner wheel 48 of the tandem pair. The rotary union 26 is spin stabilized, allowing it to rotate co-axially with the wheels 46-48, and to move in the direction of travel of the vehicle when in motion. In FIG. 5B, we have illustrated one embodiment of a bracket assembly adapted to couple both the rotary union 26 and the wheel cover 30 to the hub 58 (see, FIG. 5B). In FIG. 5C, we have illustrated a different embodiment whereby the wheel cover 30 is coupled to the non-rotating portion of the rotary union 26, and therefore would not rotate with the hub 58. As shown in FIG. 6, the rotary union 26 is coupled via the hose 20 to the T junction 24 (hidden behind the fairing panel 12).

Figure 7:
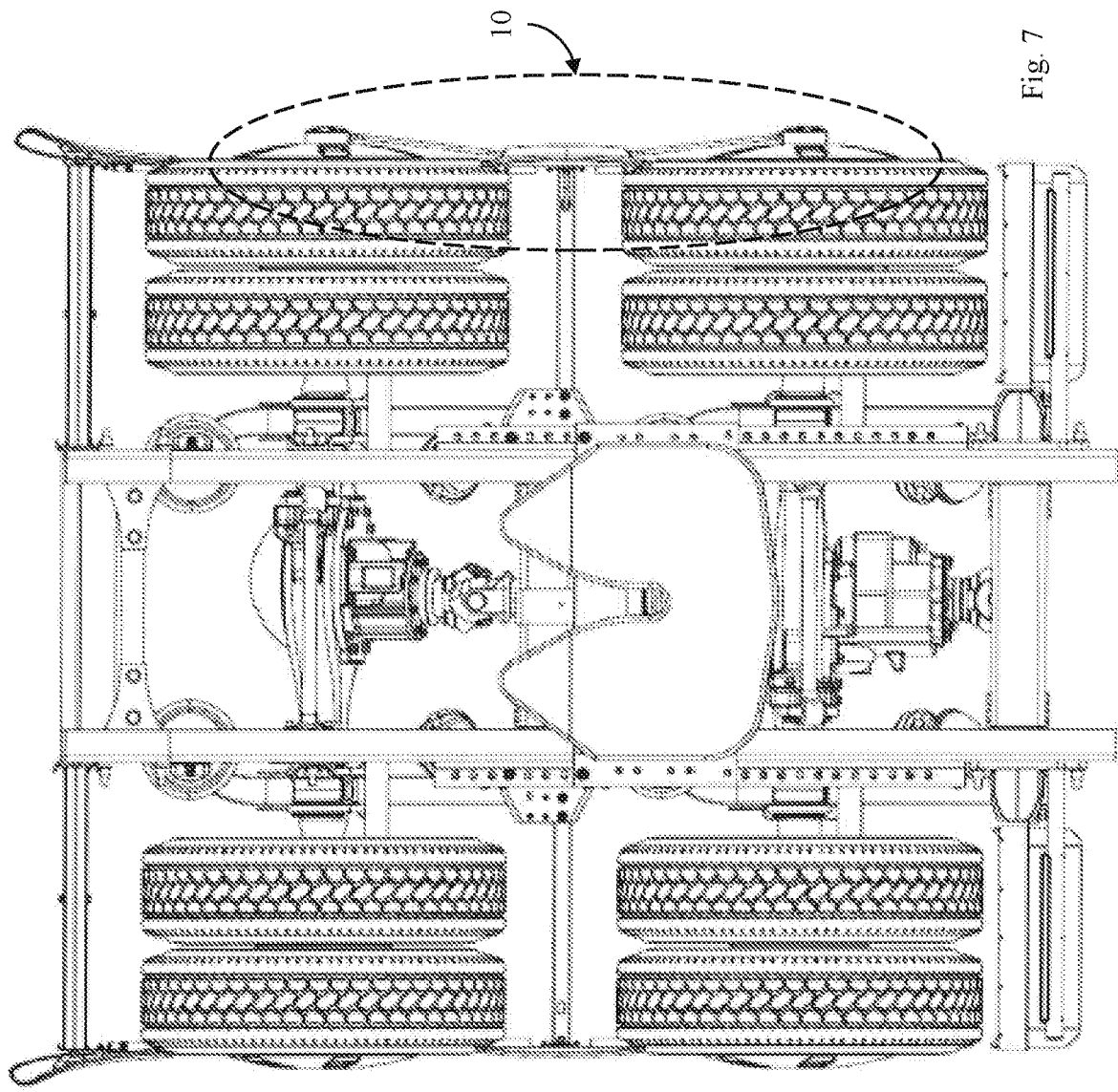
FIG. 7 illustrates, in top plan view, the rear portion of a tractor with the system of FIG. 1 installed on the right side and an un-modified aerodynamic fairing and wheel cover system on the left side.

In the embodiment illustrated in FIG. 7, a prior art unmodified aerodynamic system is installed on the left side of the tractor, and our modified aerodynamic system 10 (generally within the dashed oval) installed on the right side. As can be readily appreciated, our system 10 encloses much of the pressurized air lines to protect them from damage resulting from road debris, accident, attachment of a trailer or any other unforeseen event.

Figure 8A:
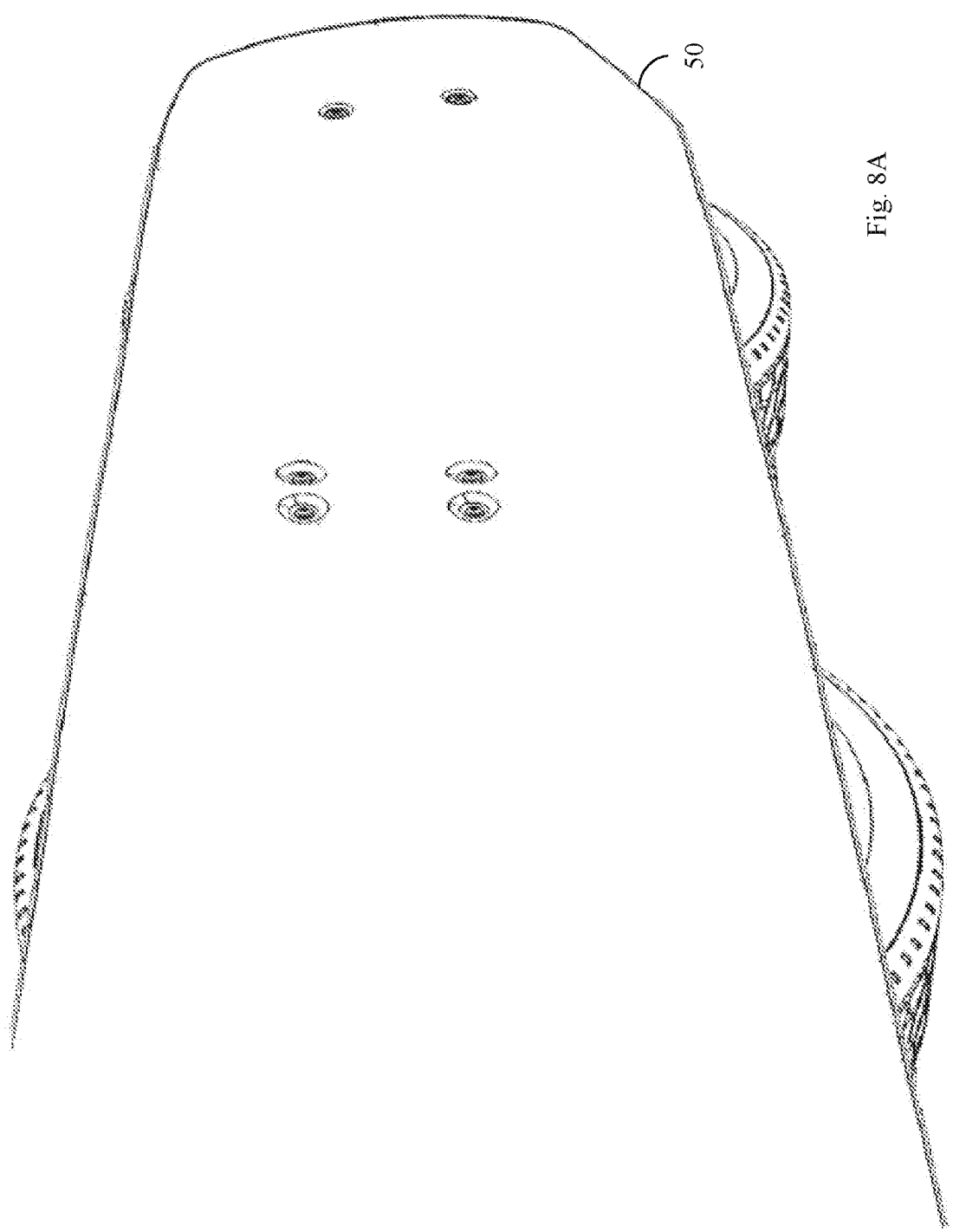
FIG. 8A and FIG. 8B, is one embodiment of a full fairing system that may be adapted to practice our invention.
Figure 8B:
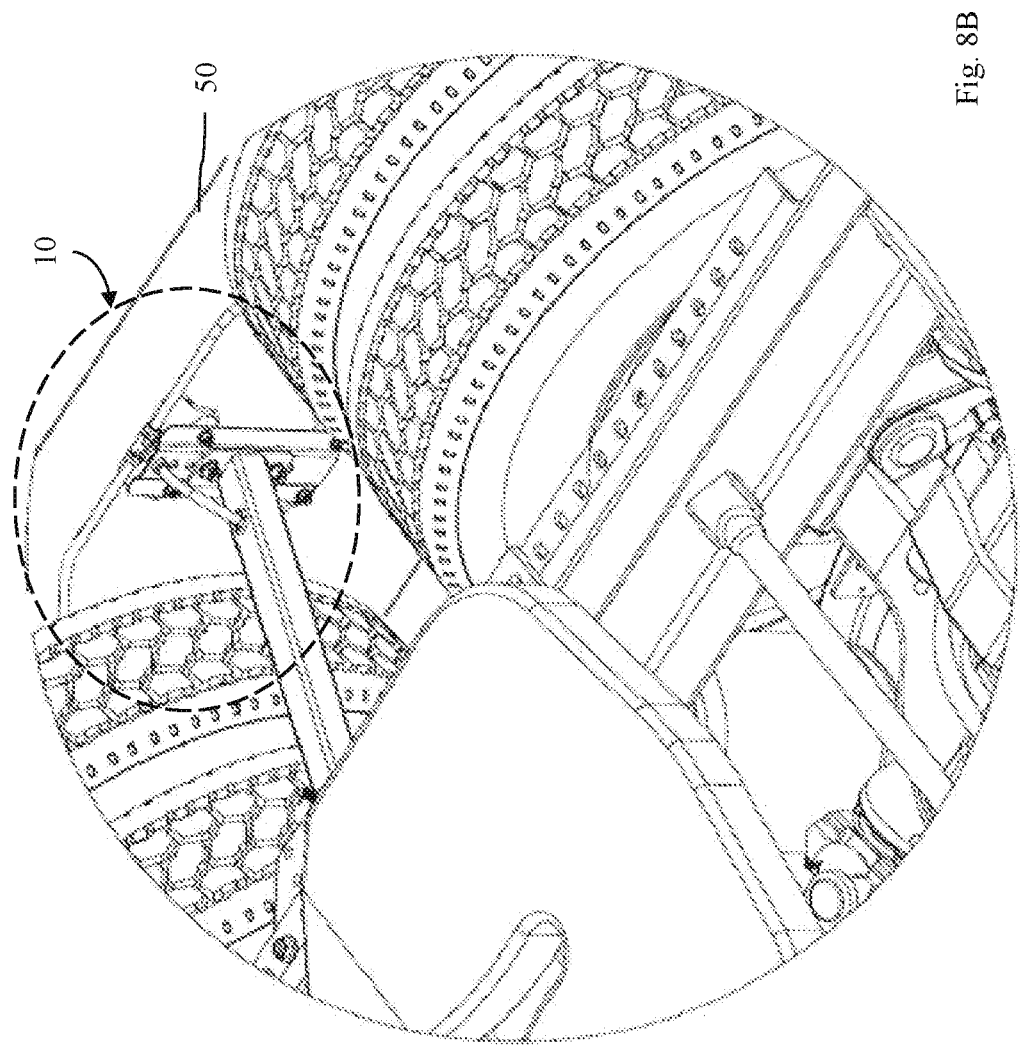

In the embodiment of our invention shown in FIG. 8, a single large aerodynamic fairing 50 is used in lieu of a center aerodynamic fairing panel 12 or wheel covers 30-32. As can be seen in FIG. 8B, the aerodynamic fairing 50 may be configured so as to completely hide and protect the hoses, T junction, and other components of our tire inflation system 10 (generally within the dashed oval). The single large fairing 50 may be supported by the fairing mounting structures shown in FIG. 1; it may be supported by one or more rotary unions 26-28 mounted to the hubs; it may be supported by additional mounting brackets connected to the chassis; or it may be supported by any combination thereof. Additional improvements and other features may be added to any of the several illustrated fairing systems. These may include, for example, visual indicators such as LED lights, which could be used to indicate whether or not the system is operating normally or if there is an issue that requires maintenance.

Figure 9:
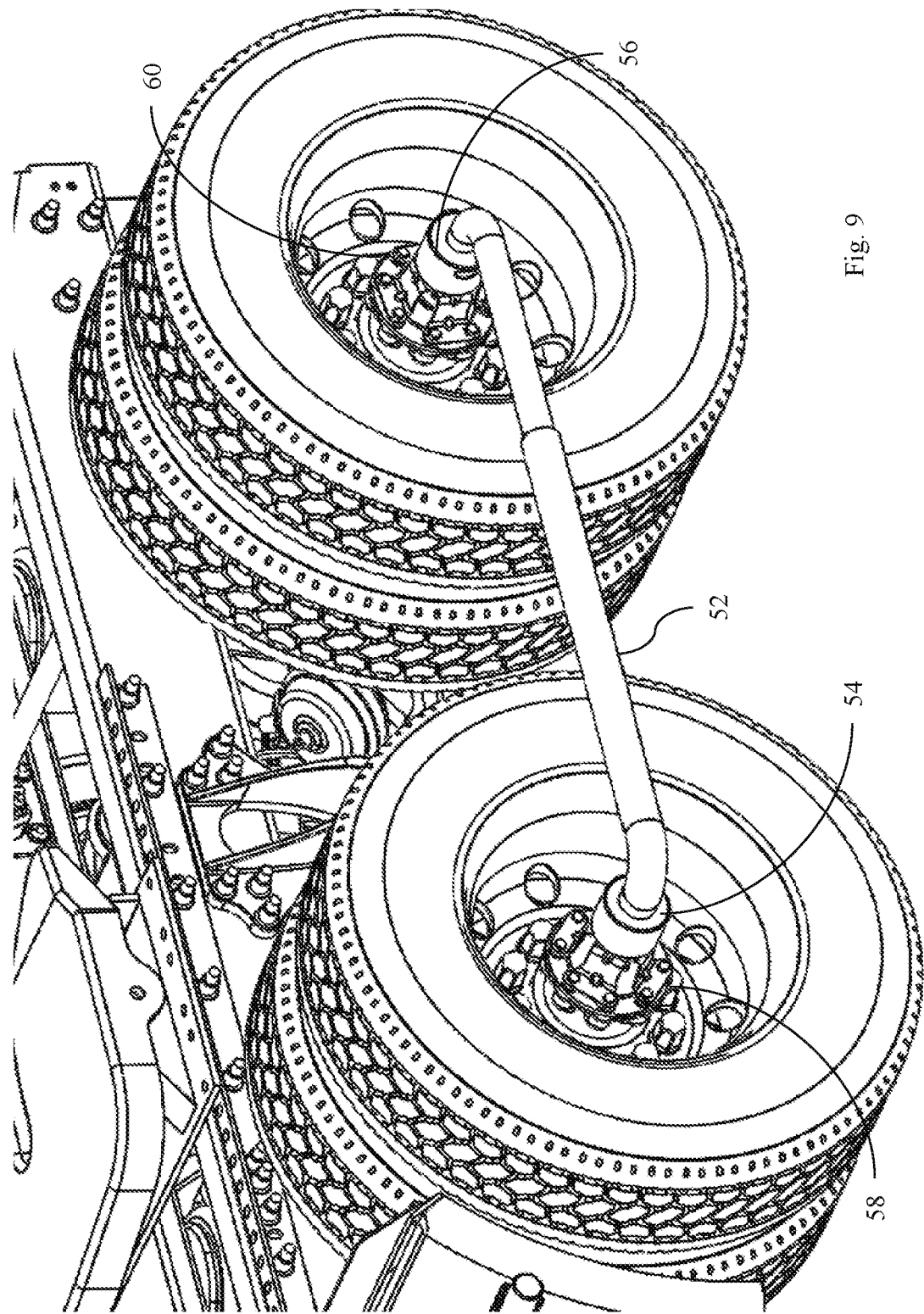
FIG. 9 is a perspective view of one other embodiment of our energy extraction and delivery facility.

In the embodiment of our invention shown in FIG. 9, a single torsion tube 52 connects rotary couplings 54-56, each of which is connected to a respective one of the hubs 58-60. Since both the distance between, and the relative orientation of, the hubs 58-60 varies dynamically, depending on road conditions, we have configured the torsion tube 52 to be telescopic with respect to length. In general, we intend the torsion tube 52 to provide a relatively fixed point of leverage with respect to both of the hubs 58-60. The rotary couplings 54-56 may need to be more durable with respect to rotary unions commercially available through Vigia, for example, which are not designed to support the load from additional components mounted thereto. In order for rotary couplings 54-56 to be properly implemented it may be desirable for a rotary union to be used inside of the rotary coupling, whereby the rotary union is not required to support the additional load of the torsion tube 52 or other devices which may be attached thereto. The ability to support a non-rotating load from a hub of the vehicle may not be demonstrated in prior art. However, we submit that an individual skilled in the art of mechanical systems and bearing support structures will be able to design a suitably robust rotary coupling 54-56. Another potential application for the torsion tube 52 could be to provide feedback regarding the linear distance between the two rotary couplings 54-56. This could be done by using laser displacement sensors, a sliding potentiometer, or other means known in the art to measure distance with reasonable accuracy. The distance measurement may be useful, for example, in order to determine if the axles are aligned or if they have shifted out of tolerance from their original position.

In the embodiment illustrated in FIG. 10A, each of the rotary couplings 54-56 is adapted to receive a respective air pump 62-64, e.g., a peristaltic pump. In particular, one portion of pump 62 is substantially fixed with respect to hub 60 and the other portion rotates with hub 58; and, similarly, one portion of pump 64 is substantially fixed with respect to hub 58 and the other portion rotates with hub 60. Thus, upon rotation of the respective hub 58-60, the associated pump 62-64 will deliver compressed air at a predetermined pressure to a respective pair of the valve stems 66-68 and 70-72.

Figure 10B:
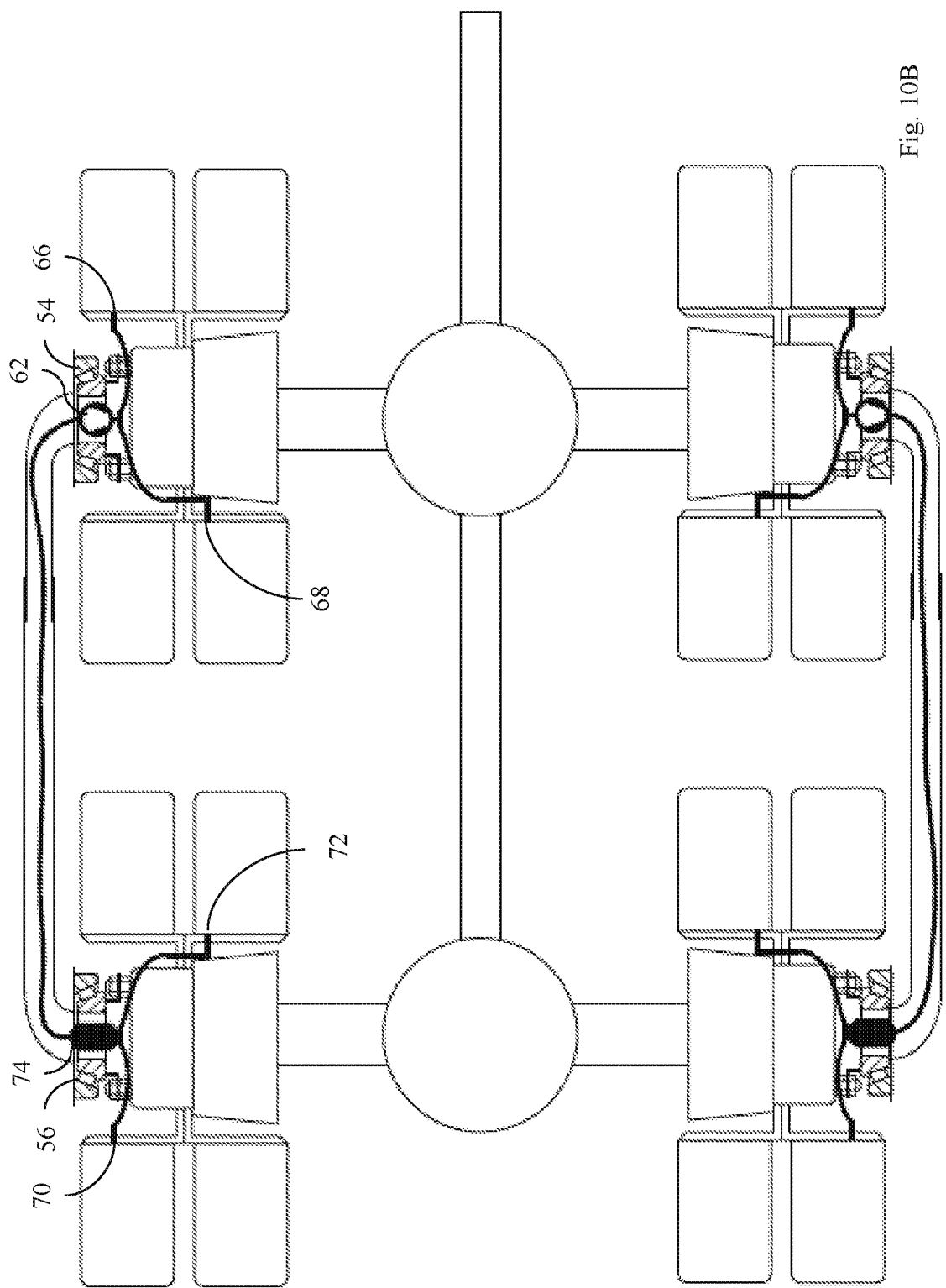

In the embodiment illustrated in FIG. 10B, only the rotary coupling 54 is adapted to receive an air pump 62, while the other rotary coupling 56 is adapted to receive a rotary union 74. In this embodiment, a single pump 62 provides compressed air to both pairs of valve stems 66-68 and 70-72.

Figure 10C:
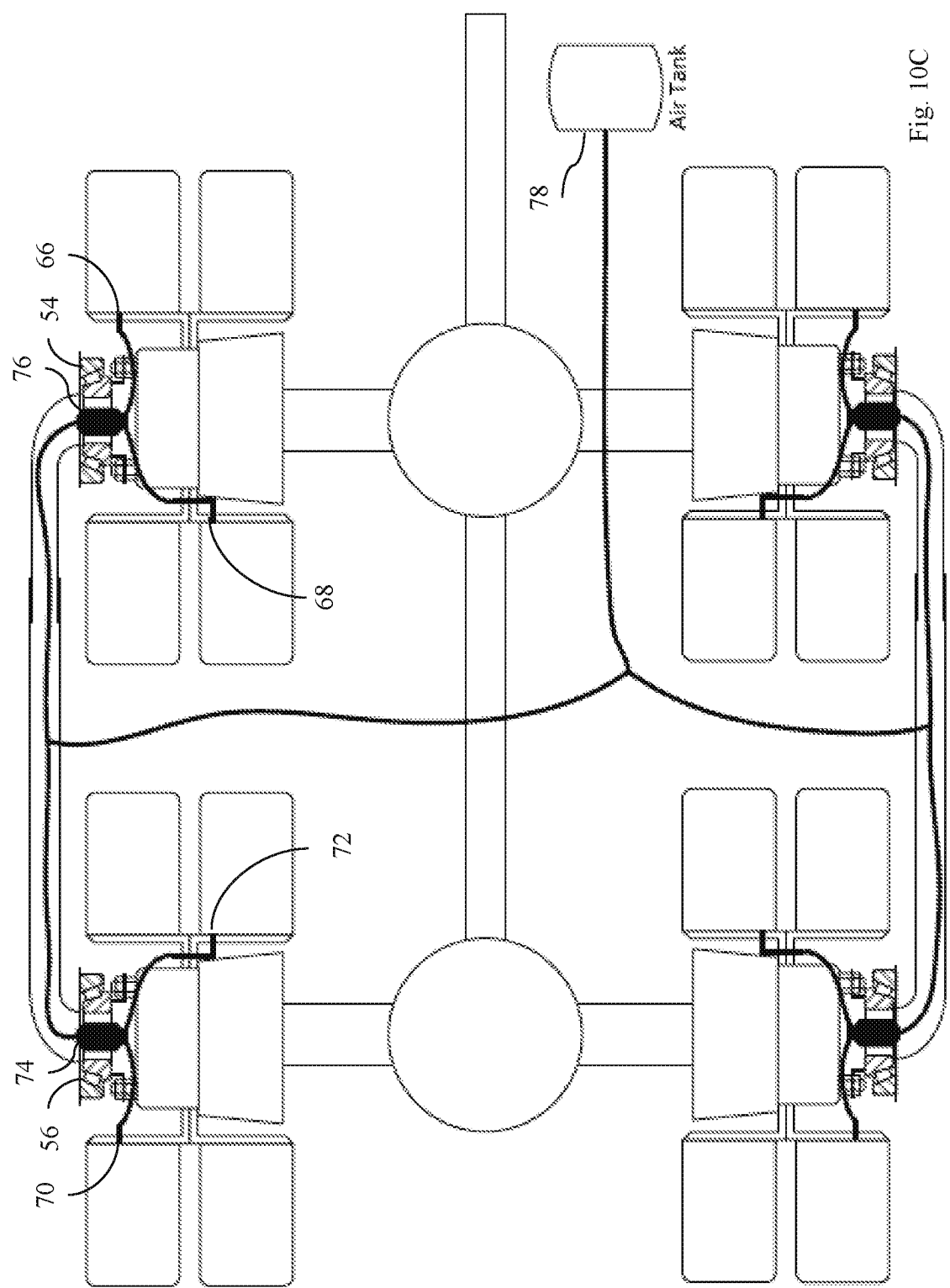

In the embodiment illustrated in FIG. 10C, both of the rotary couplings 54-56 are adapted to receive a rotary union 74-76. In this embodiment, compressed air is delivered to both pairs of valve stems 66-68 and 70-72 directly from the vehicle's existing compressed air source 78. It should be noted that one advantage of this method over conventional external tire inflation systems is that the utilization of the torsion tube 52 (or other devices described throughout this document that link the hubs) could eliminate or reduce the size of a frame-mounted support structure for the hoses.

Figure 10D:
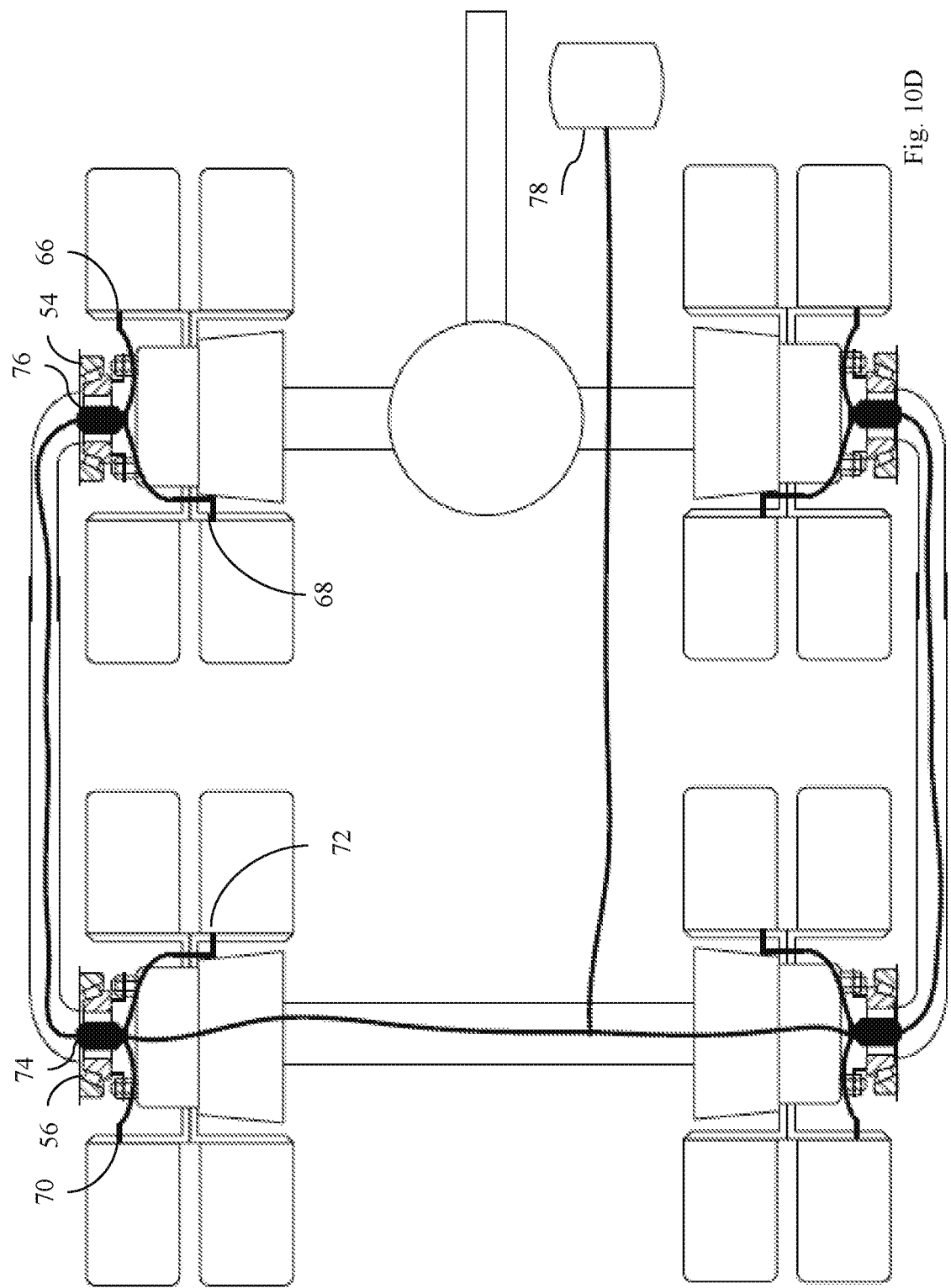

In the embodiment illustrated in FIG. 10D, the rear axle is non-driven and can be used as a routing channel for the compressed air line from the supply 78, similar to commercially available internal tire inflation systems for non-driven axles. In this embodiment, as in the embodiment illustrated in FIG. 10C, compressed air is delivered to both pairs of valve stems 66-68 and 70-72 directly from a compressed air source 78. One prior art example of such an arrangement, currently commercially available from Vigia can be seen at: vigia.ca/webshop/images/categories/parts_hollow.jpg, which is expressly incorporated herein by reference.

In the embodiment illustrated in FIG. 10E, the rear axle is again non-driven and can be used as a routing channel for the compressed air line from the pump 62. In this embodiment, however, compressed air is delivered to both pairs of valve stems 66-68 and 70-72 from a single, hub-driven pump 62. The advantage of using fewer pumps could include reduced cost, reduced weight, reduced maintenance, lower pumping losses, and others.

Figure 11B:
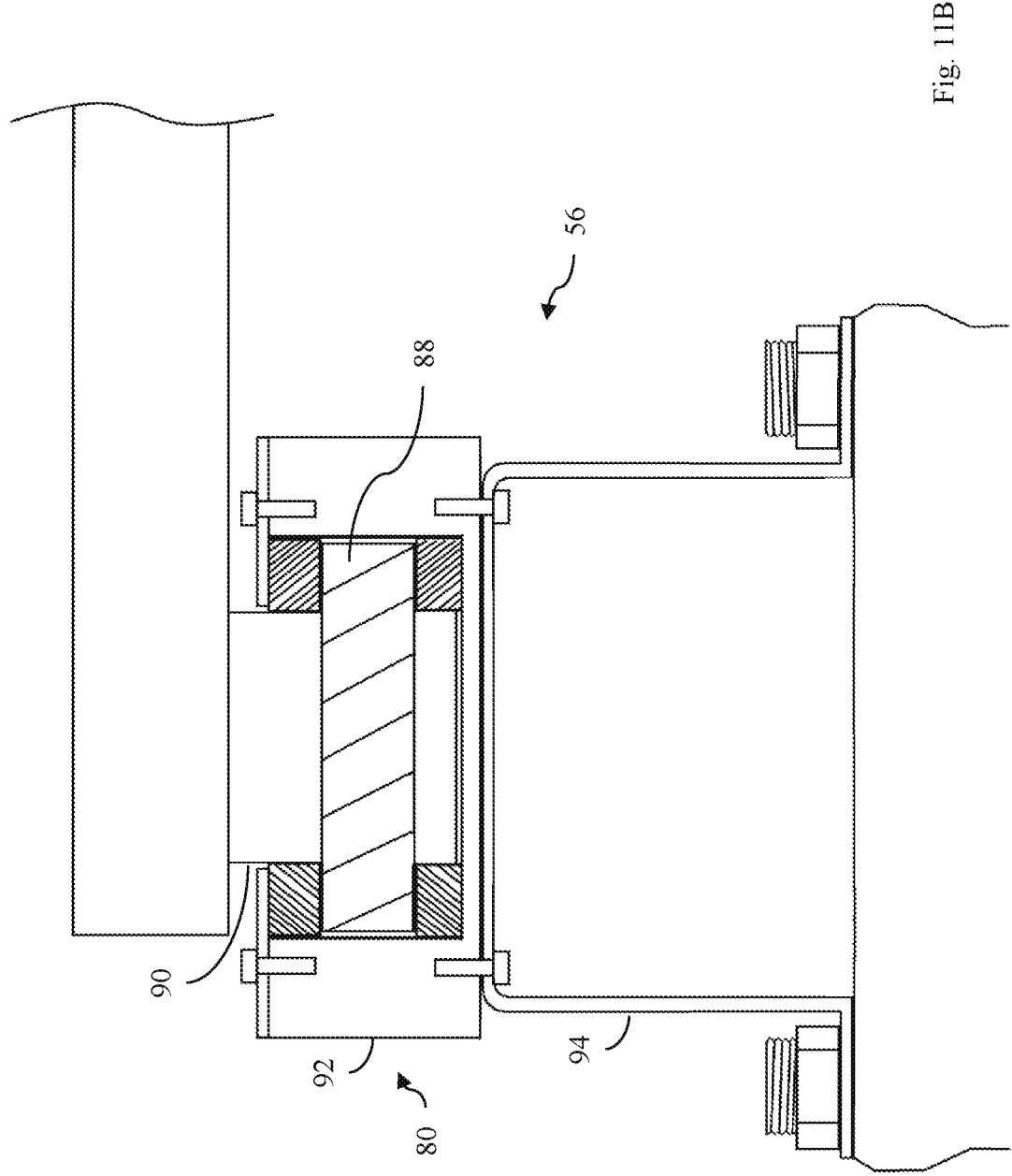

In the embodiment illustrated in FIG. 11A, each of the rotary couplings 54-56 is adapted to receive a respective rotational energy facility 80-82. In particular, the stator portion of rotational energy facility 80 is substantially fixed with respect to hub 60 and the rotor portion rotates with hub 58; and, similarly, the stator portion of rotational energy facility 82 is substantially fixed with respect to hub 58 and the rotor portion rotates with hub 60. For example, let us assume that the rotational energy facility 80 is enabled to operate in a motor mode, then, upon controlled delivery of electrical current from an electrical storage 84 via a control facility 86, the rotational energy facility 80 will exert torque on the hub 58. If, however, we assume that the rotational energy facility 80 is enabled to operate in a generator mode, then, upon rotation of the hub 58, the rotational energy facility 80 will develop and deliver electrical current back to the electrical storage 84 via the control facility 86. U.S. Pat. No. 8,955,626 discloses one example of a vehicle-mounted, rotational energy facility in which the stator portion is fixed with respect to the axle to which the facility itself is coupled, i.e., it can be considered self-referencing with respect to the fixed point of leverage. In contrast, in the embodiment illustrated in FIG. 11A, our rotational energy facility 80 is configured such that the stator portion is fixed with respect to the other hub 60, i.e., it can be considered cross-referencing with respect to the fixed point of leverage. In this dual-axle embodiment, we consider each hub to be cross-referenced to the other hub. By way of example, in FIG. 11B, we have illustrated one possible embodiment of a rotational energy facility 80, wherein a stator portion 88 of the rotational energy facility 80 is coupled to a stator portion 90 of the rotary coupler 56, and a rotor portion 92 of the rotational energy facility 80 is coupled to a rotor portion 94 of the rotary coupler 56.

It should be noted that although one rotational energy can be used on each hub, it may be preferable to use fewer rotational energy facilities, or to configure one rotational energy facility to act as a generator, and a different rotational energy facility to act as a motor. It may also be preferable to utilize energy storage means such as a battery or capacitor which is integrated into the torsion tube 52, thereby eliminating the need for additional wiring of the system.

Although we have shown a rotational energy system independently from an inflation system, it may be preferable to combine both systems and utilize the same torsion tube 52 to transmit a combination of pressurized air and electricity. It would also be obvious to those skilled in the art that the rotational energy system may be hydraulic instead of electric, for example, whereby compressed air could be used for both tire inflation as well as driving motors which assist in powering the vehicle. It may also be preferable to utilize the rotational energy to provide a braking force to one or more wheels. Furthermore, it may be preferable to use the electricity to drive an electric air compressor which is used to provide pressurized air to the tires. Still further, the system could power commercially available devices such as tire pressure monitoring systems which normally utilize batteries that have a limited lifespan. Providing electrical power to other types of sensors and signal transmission technologies that may be mounted to the wheels may also be beneficial and made possible through various embodiments of this invention.

Although we have described several embodiments of tire inflation systems predominantly comprising pumps and the associated means for increasing tire pressure, it may also be preferable to incorporate means for reducing or regulating the air pressure of the tires. In some cases, the tires could become over-inflated or the temperature changes over time could cause the tire pressure to be higher than the recommended tire pressure. It may also be preferable to reduce the tire pressure if driving off-road, for example. Some existing external tire inflation systems incorporate this technology already, and so, for that reason, we have not described these at length herein. Other benefits of our system may be for tire pressure equalization. Some devices such as the crossfire equalize air pressure between two tires mounted on the same side of a single axle. However, with our invention it is now possible to equalize all of the tires on any axle with a hub that is connected via a torsion tube to the hub on another axle, for example.

Figure 12A:
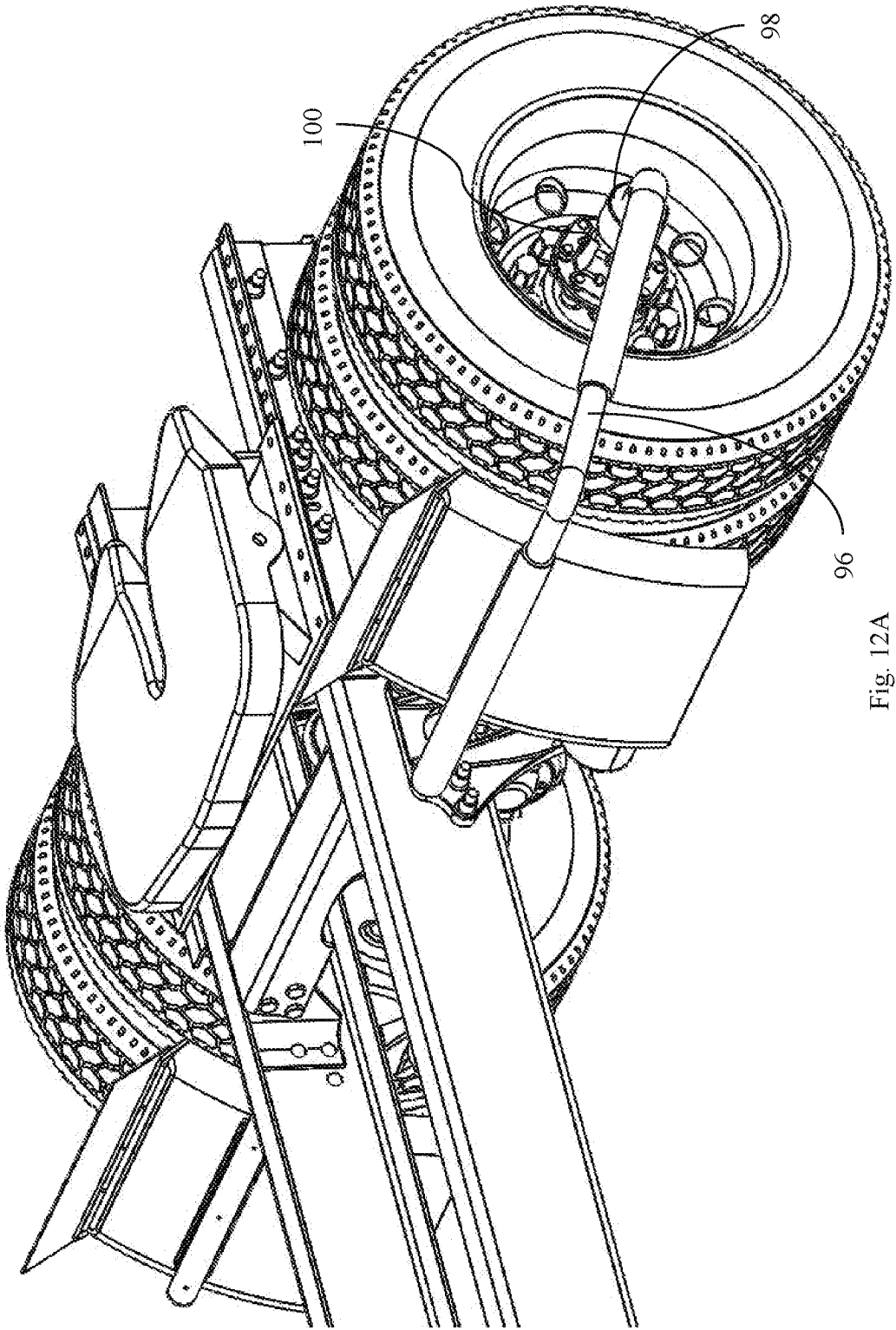
FIG. 12A and FIG. 12B, is a perspective view of additional possible embodiments of our energy extraction and delivery facility.
Figure 12B:
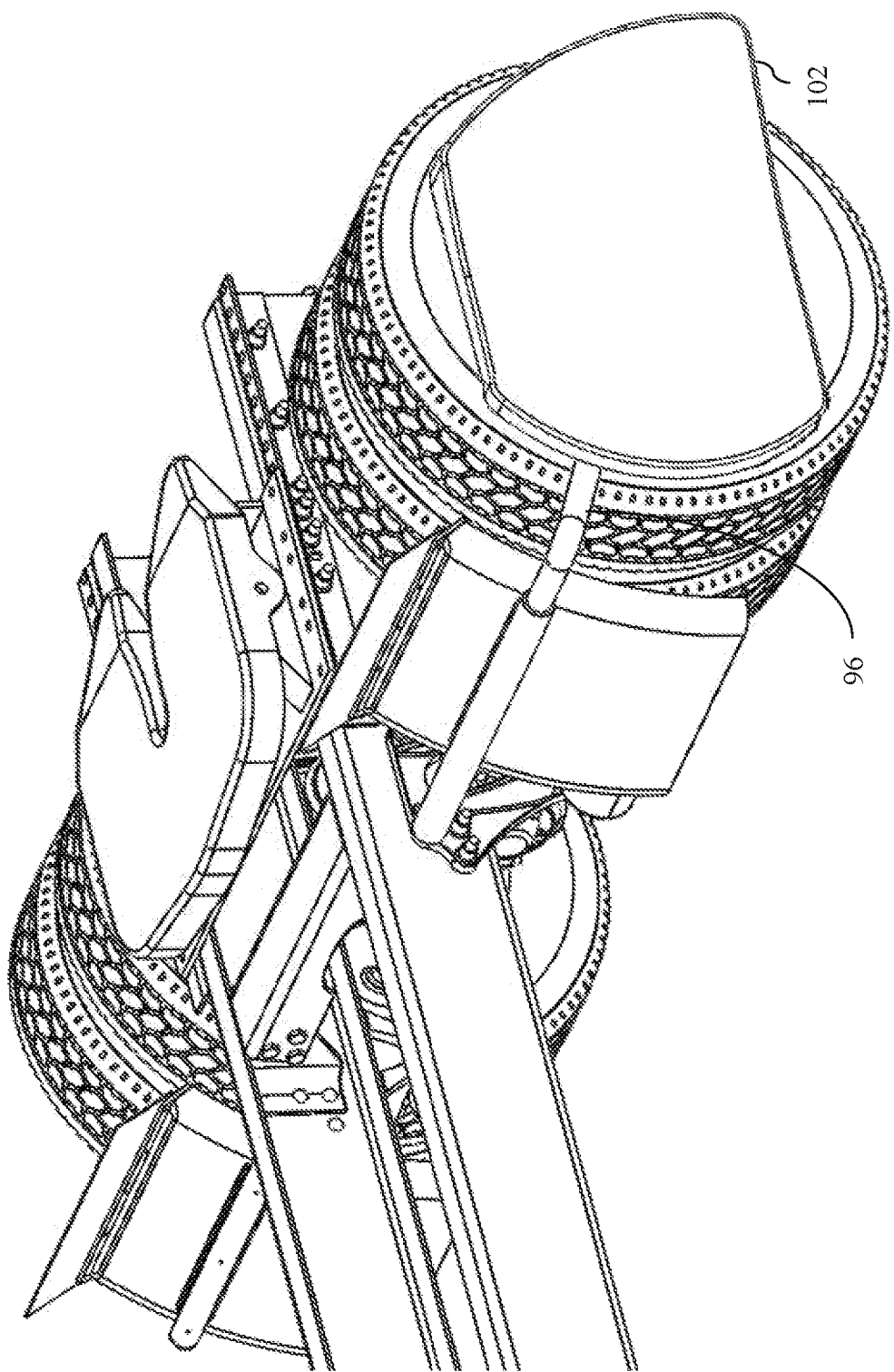

In the single-axle embodiment illustrated in FIG. 12, a single torsion tube 96 couples a single rotary coupling 98 directly to a fixed portion of the chassis, e.g., an existing splash guard or the like. Since both the distance between, and the relative orientation of, the hub 100 varies dynamically with respect to the selected fixed portion of the chassis, depending on road conditions, we have configured the torsion tube 96 to be telescopic with respect to length, and, preferably, to rotate with respect to the frame. In general, we intend the torsion tube 96 to provide a relatively fixed point of leverage with respect to the hub 100. In this single-axle embodiment, we consider the hub to be cross-referenced to the frame. As illustrated in FIG. 12B, the torsion tube 96 may be adapted to support a single wheel fairing panel 102. Alternatively, it may also be desirable to configure the panel 102 to replace the torsion tube 96, so long as the fairing panel 102 is designed to provide adequate structural integrity.

Figure 13B:
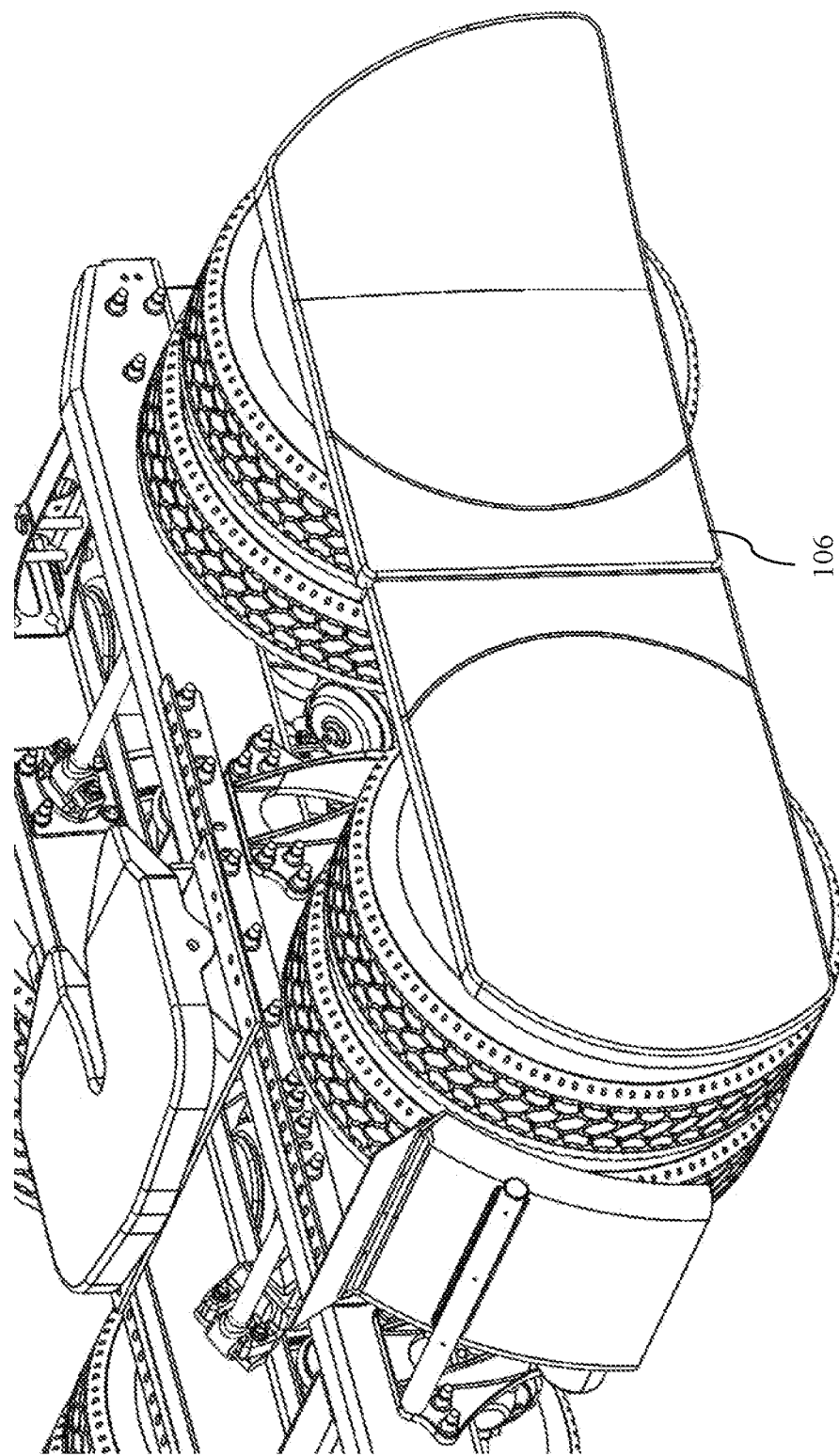

In the embodiment shown in FIG. 13, we use a dual torsion tube assembly 104 to couple hub 58 to hub 60, not only to provide additional stiffness but also to more rigidly support a hinged, multi-wheel fairing system 106 such as that illustrated in FIG. 13B and FIG. 13C. Alternatively, the fairing system 106 may incorporate sliding aerodynamic panels, or other accessibility features known in the art. Although we have illustrated, by way of example, the hose/wire as running through the lower torsion tube portion, it may just as readily be run through the upper torsion bar portion.

Figure 14:
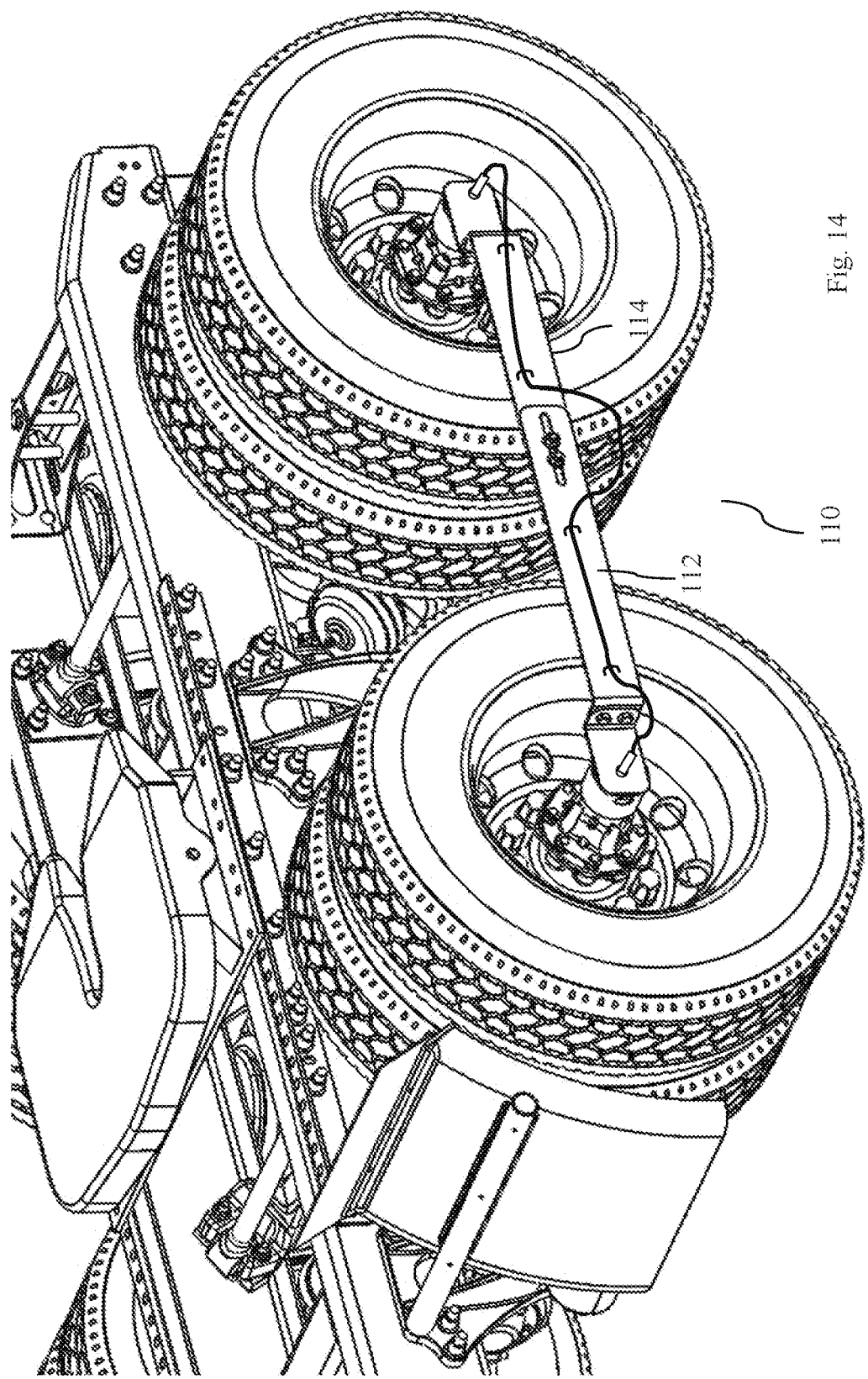
FIG. 14 is a perspective view of one further embodiment of our energy extraction and delivery facility.
Figure 15:
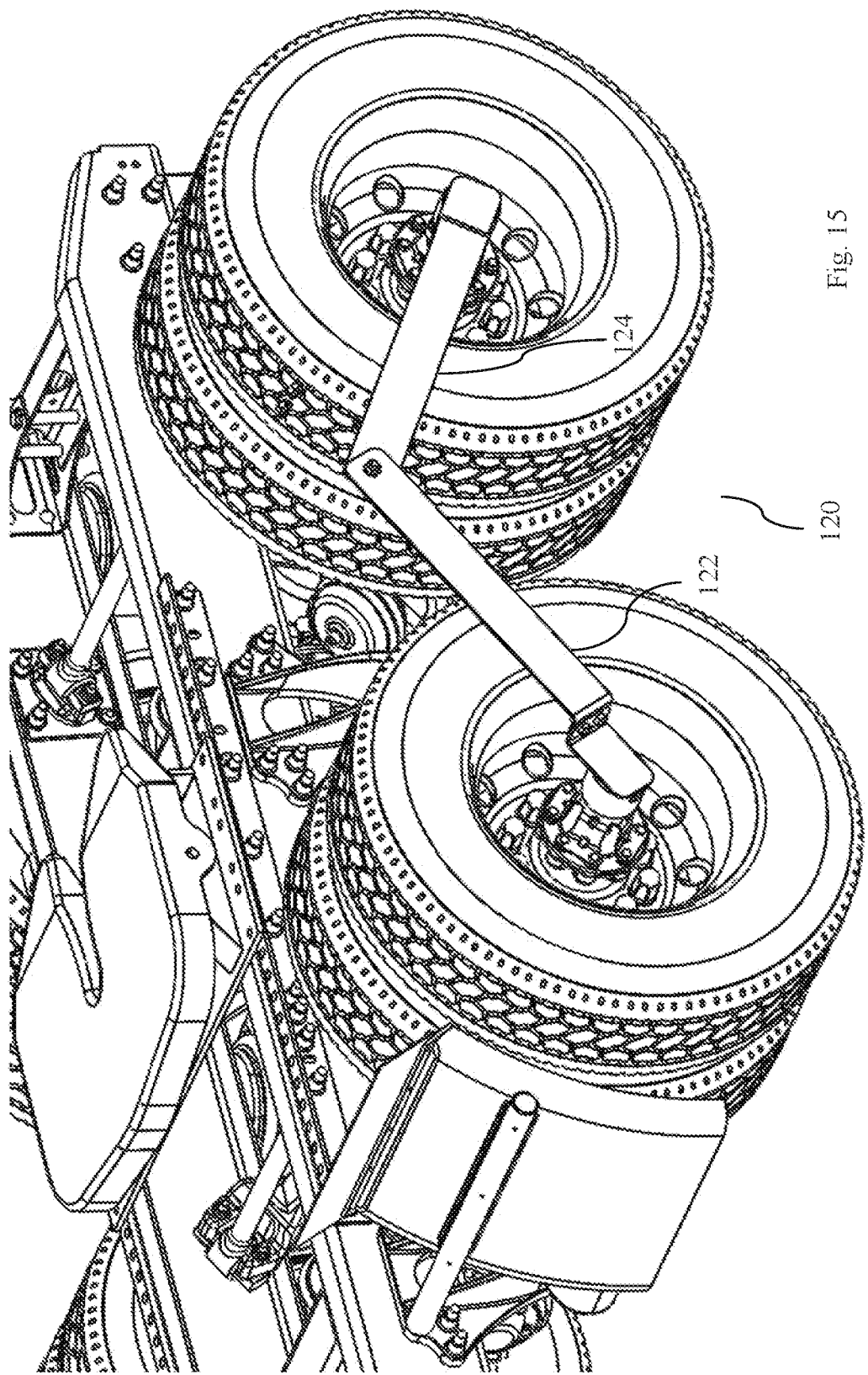
FIG. 15 is a perspective view of one more embodiment of our energy extraction and delivery facility.

FIG. 14 is a perspective view of one further embodiment of an energy extraction and delivery facility 110. In the embodiment of FIG. 14, an assembly comprising a first link 112 and second link 114 are used to couple hub 58 to hub 60. FIG. 15 is a perspective view of one further embodiment of an energy extraction and delivery facility 120. In the embodiment of FIG. 15, an assembly comprising a first link 122 and second link 124 are used to couple hub 58 to hub 60.

Although we have described the use of compressed air in accordance with our invention in the context of hybridizing the vehicle or inflating tire pressure, the compressed air may also be utilized for other means such as for inflatable aerodynamic fairings such as taught in U.S. Pat. No. 9,873,467. The inflatable components may, for example, be extensions of existing fairings which are only deployed when the vehicle is in motion, or when compressed air is being delivered to the system. The compressed air may also be used for boundary layer control of aerodynamic fairings or surfaces of the vehicle as shown in U.S. Pat. No. 8,870,275, and similar art. The compressed air may also be used to replace the air pump on the vehicle, if so equipped.

The system as shown in FIG. 9 and other figures may also incorporate mounting means whereby the torsion tube is mounted to a non-rotating component of the axle. This may be possible if there is an existing hole through the hub, or if a hole can be made through the hub. In this configuration, however, some other means should be provided to support the end of the torsion tube rather than the hub, per se.

Although we have described our invention in the context of particular embodiments, one of ordinary skill in this art will readily realize that many modifications may be made in such embodiments to adapt either to specific implementations. For example, our system may easily be adapted such that the air lines traverse through a different type of fairing, such as those shown in U.S. Pat. Nos. 9,027,983 and 8,814,253. Thus it is apparent that we have provided a chassis mounted energy extraction and delivery facility that is both effective and efficient.

What we claim is:
1. An aerodynamic system comprising:
 a torsion tube;
 a first rotary coupling coupled to the torsion tube and adapted to mount to a first wheel hub;

a second rotary coupling coupled to the torsion tube distal from the first rotary coupling and adapted to mount to a second wheel hub; and a non-rotating fairing panel mounted to the torsion tube.

2. The aerodynamic system of claim 1, comprising at least one of an air line or an electrical line coupled to the fairing panel and adapted to connect between the fairing panel and a vehicle chassis of a vehicle.

3. The aerodynamic system of claim 1, comprising at least one of an air line or an electrical line that runs through the first rotary coupling and the second rotary coupling and is adapted to connect between the first wheel hub and the second wheel hub.

4. The aerodynamic system of claim 1, comprising at least one of an air line or an electrical line that runs through the first rotary coupling or second rotary coupling and is adapted to connect between the first wheel hub or second wheel hub and a vehicle chassis of a vehicle.

5. The aerodynamic system of claim 1, comprising a sensor to measure and provide feedback for a distance between the first wheel hub and the second wheel hub.

6. The aerodynamic system of claim 1, further comprising one or more of a pump, a generator, or a motor.

7. The aerodynamic system of claim 1, wherein the fairing panel is constructed of multiple panels.

8. The aerodynamic system of claim 1, wherein the fairing panel comprises at least one of a hinged panel or a removable panel.

9. The aerodynamic system of claim 1, wherein the fairing panel is constructed of multiple panels.

10. The aerodynamic system of claim 1, wherein the non-rotating fairing panel is adapted to cover at least a portion of a first wheel and at least a portion of a second wheel rearward of the first wheel.

11. An aerodynamic system comprising:
a rotary coupling mountable to a wheel hub of a vehicle; and
a non-rotating aerodynamic fairing panel adapted to cover at least a portion of a wheel of the vehicle, wherein the non-rotating aerodynamic fairing panel is:
coupled to the rotary coupling;
coupled to a torsion tube;
wherein the torsion tube is rigidly mountable to a vehicle chassis at a second location offset from the wheel hub.

12. The aerodynamic system of claim 11, further comprising at least one of an air line or an electrical line coupled to the non-rotating aerodynamic fairing panel and adapted to connect between the non-rotating aerodynamic fairing panel and the vehicle chassis of the vehicle.

13. The aerodynamic system of claim 12, wherein the at least one of the air line or the electrical line runs through the rotary coupling and is adapted to connect between the wheel hub and the vehicle chassis of the vehicle.

14. The aerodynamic system of claim 12, further comprising a sensor to measure and provide feedback for a distance between the wheel hub and a non-rotating location on the vehicle chassis.

15. The aerodynamic system of claim 12, further comprising one or more of a pump, a generator, or a motor.

16. The aerodynamic system of claim 11, wherein the non-rotating aerodynamic fairing panel is constructed of multiple panels.

17. The aerodynamic system of claim 11, wherein the non-rotating aerodynamic fairing panel comprises at least one of a hinged panel or a removable panel.

18. The aerodynamic system of claim 12, wherein the second location is a non-rotating location on the vehicle chassis of the vehicle.

19. The aerodynamic system of claim 12, wherein the non-rotating aerodynamic fairing panel is adapted to cover at least a portion of a second wheel.

20. An aerodynamic system comprising:
a rotary coupling mounted to a wheel hub of a vehicle; and
a non-rotating aerodynamic fairing panel covering at least a portion of a wheel of the vehicle, wherein the non-rotating aerodynamic fairing panel is:
coupled to the rotary coupling;
coupled to a torsion tube;
wherein the torsion tube is rigidly mounted to a vehicle chassis at a second location offset from the wheel hub.

* * * * *